United States Patent [19]

Utagawa

[11] Patent Number: 5,068,682
[45] Date of Patent: Nov. 26, 1991

[54] FOCUS ADJUSTER

[75] Inventor: Ken Utagawa, Yokohama, Japan

[73] Assignee: Nikon Corporation, Tokyo, Japan

[21] Appl. No.: 587,601

[22] Filed: Sep. 24, 1990

Related U.S. Application Data

[63] Continuation of Ser. No. 435,939, Nov. 14, 1989, abandoned.

[30] Foreign Application Priority Data

Nov. 16, 1988 [JP] Japan ............................. 63-287731

[51] Int. Cl.⁵ ............................................. G03B 13/00
[52] U.S. Cl. ...................................................... 354/402
[58] Field of Search ............................. 354/400–409;
250/201 PF, 204

[56] References Cited

U.S. PATENT DOCUMENTS

| | | | |
|---|---|---|---|
| 4,636,624 | 1/1987 | Ishida et al. | 354/406 |
| 4,687,917 | 8/1987 | Kusaka et al. | 354/408 |
| 4,812,869 | 3/1989 | Akashi et al. | 354/408 |
| 4,851,657 | 7/1989 | Taniguchi et al. | 354/408 |

FOREIGN PATENT DOCUMENTS 63-11906 1/1988 Japan.

Primary Examiner—L. T. Hix
Assistant Examiner—David M. Gray
Attorney, Agent, or Firm—Shapiro and Shapiro

[57] ABSTRACT

A focus adjustor performing highly accurate focus adjustment to suit the photographer's intention with respect to a great variety of objects to be photographed. The focus adjustor permits appropriate division of focus detection area, permits selection of an area division such as to reflect the photographer's intention and permits use of the result of previous focus adjustment for a subsequent focus adjustment.

17 Claims, 20 Drawing Sheets

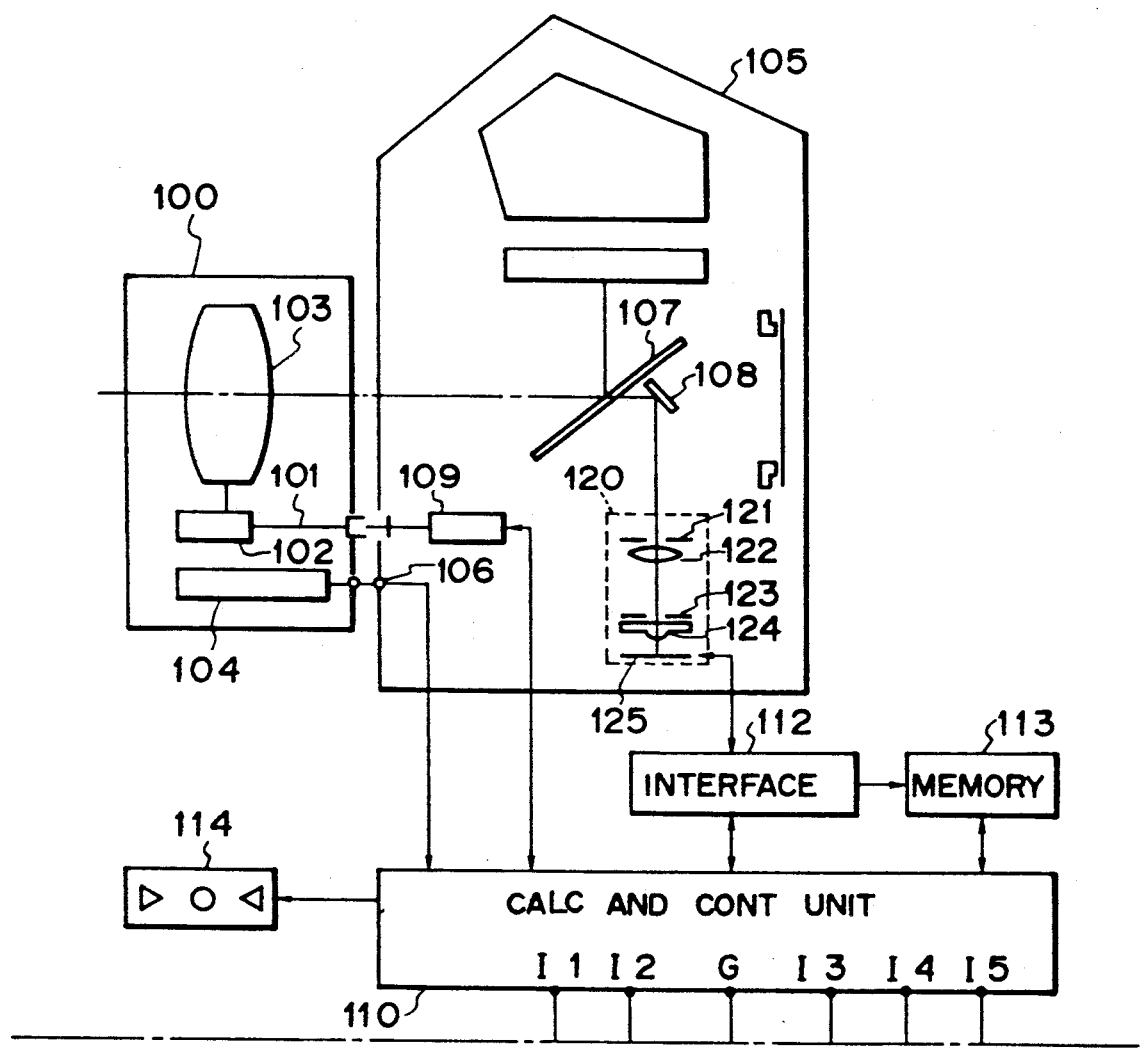
FIG.11A-a

FIG.11A-b
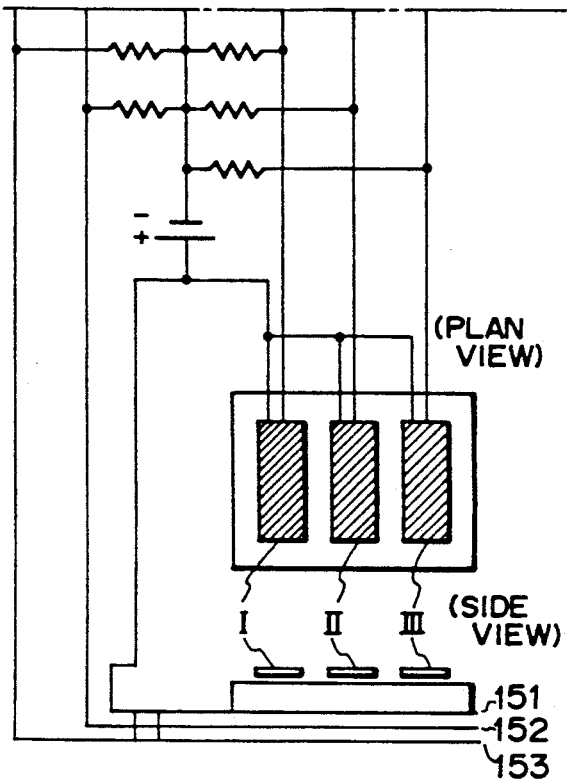
FIG.11H
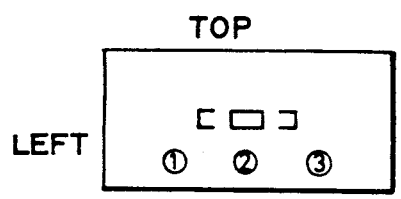
FIG.11B  FIG.11C  FIG.11D
  
FIG.11E  FIG.11F  FIG.11G
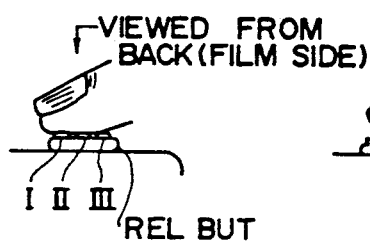  

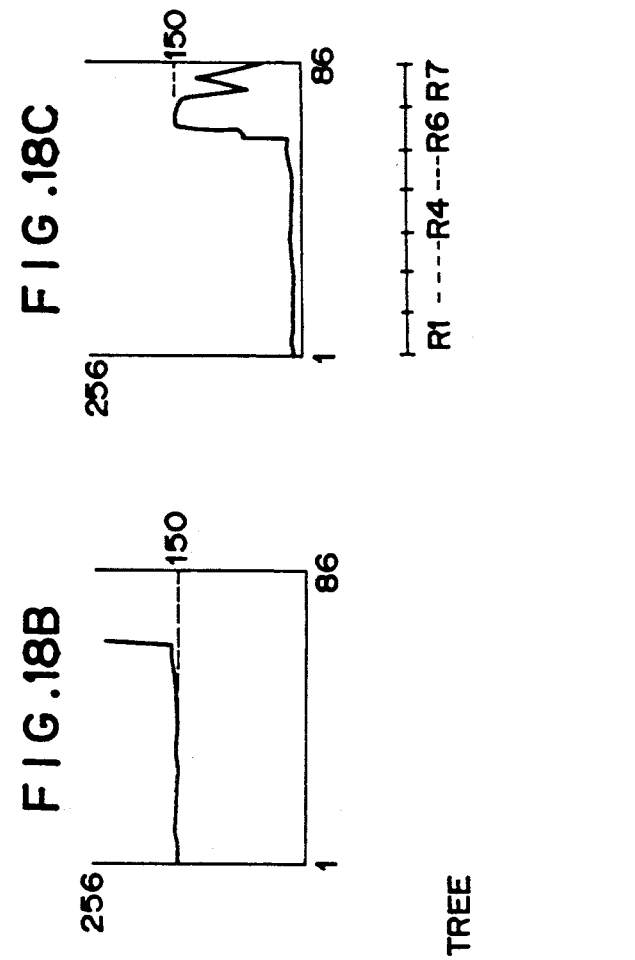
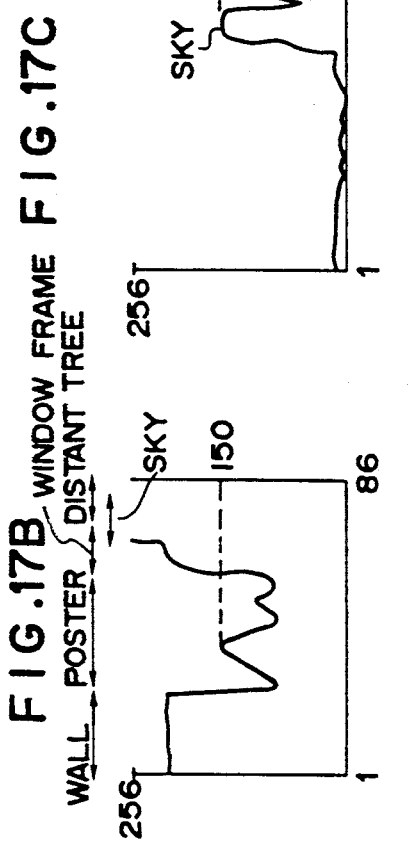
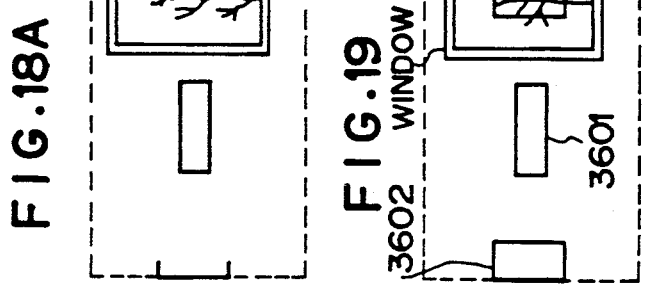
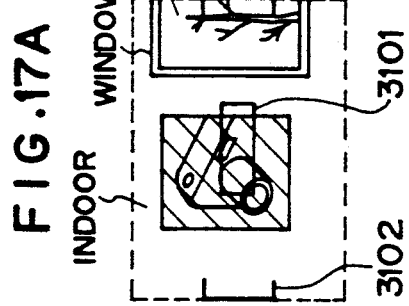

IMAGE PROJECTED ON AREA A

IMAGE PROJECTED ON AREA B

IMAGE PROJECTED ON AREA A

CLOSE-RANGE VIEW — DISTANT VIEW

IMAGE PROJECTED ON AREA B

CLOSE-RANGE VIEW — DISTANT VIEW

CLOSE-RANGE VIEW — DISTANT VIEW

CLOSE-RANGE VIEW — DISTANT VIEW

FOCUS ADJUSTER

This is a continuation of application Ser. No. 435,939 filed Nov. 14, 1989, now abandoned.

BACKGROUND OF THE INVENTION

1. Field of the Invention

This invention relates to a focus adjuster for a camera.

2. Related Background Art

In a known focus adjuster for a camera, a pair of foreground object images is formed by two light fluxes coupled from a foreground object through two different optical paths to an optical system. In the optical system a pair of--; photoelectric converting means converts the light fluxes into a pair of foreground object image signals consisting of a pair of discrete data, upon which predetermined correlation operations are performed while shifting the paired foreground object signals relative to each other, in order to determine a shift amount of the highest correlation degree and calculate a defocus of the optical system from that shift amount.

Such a focus adjuster will now be described with reference to FIGS. 20 and 21.

FIG. 20 is an example of application of the prior art focus adjuster to a replaceable lens type single lens reflex camera. Replaceable lens 100 can be removably mounted in camera body 105. With lens 100 mounted, a photographing light beam from a foreground object is passed through lens 103 to main mirror 107 provided in camera body 105. The light beam is partly reflected upwardly by main mirror 107 to a viewfinder (not shown). At the same time, the remaining part of the light beam is transmitted through main mirror 107 and reflected by submirror 108 (as a focus detection light beam) to auto-focus module 120 (hereinafter AF module).

FIG. 21A shows an example of F module 120. As is shown, the AF module comprises a focus detection optical system including field lens 122 and a pair of re-focusing lenses 124 and CCD (charge-coupled device) 125 having a pair of light-receiving sections A and B. In the above construction, light flux passing through paired areas symmetrical with respect to the axis of a light incidence pupil of lens 103 forms a primary image in the neighborhood of field lens 122 and is coupled through field lens 122 and re-focusing lenses 124 to form a pair on a secondary images of the pair light-receiving sections A, B of CCD 125. When the primary image coincides with a film conjugate surface (not shown), the direction and relative position of the pair of secondary images with respect to the light-receiving sections of CCD 125 are predetermined by the construction of the focus detection optical system. More specifically, light-receiving sections A and B shown in FIG. 21B each consist of n light-receiving elements ai, bi (i =0 to n − 1), and when the primary image coincides with the film conjugate surface, a foreground object image is formed in substantially equal areas on light-receiving sections A and B. When the primary image is formed on a surface shifted from the film conjugate surface, the relative position of the pair of secondary images on CCD 125 is shifted from the equal area position noted above according to the direction of shift of the axial direction of the primary image (i.e., whether the shift is pre- or post-focus. In the case of the post-focus, for instance, the positional relation between the pair of secondary images is relatively spread, and in the case of the pre-focus it is narrowed.

Light receiving elements ai and bi forming light-receiving sections A and B consist of charge storage elements such as photo-diodes and can accumulate charge for a charge accumulation time corresponding to the illumination intensity on CCD 125 to render the light-receiving element output to be of a level suited for a subsequent process to be described later.

Returning to FIG. 20, interface 112 and memory 113 control the start and end of charge accumulation in CCD 125 by providing a control signal to CCD 125 according to charge accumulation start and end commands from calculation and control unit (AFCPU) 110. A light-receiving element output signal is sequentially transferred to the interface according to transfer clock signals supplied to CCD 125. A/D converter means provided in the interface samples and A/D converts the light-receiving element output, and A/D converted data (2n pieces) corresponding to the number of light-receiving elements are stored in memory 113. AFCPU 110 performs well-known operations for focus detection according to the stored data to determine a defocus extent corresponding to the difference between the primary image and film conjugate surface.

AFCPU 110 controls the form of display on AF display means 114 according to the result of the focus detection calculation. For example, AFCPU 114 provides a control signal such that a triangle display section becomes active in case of pre- or post-focus and a round display section becomes active in case of infocus. AFCPU 110 also controls the direction and extent of driving of AF motor 109 according to the result of focus detection operation, thus moving lens 103 to an in-focus position. According to the sign of the defocus extent (weither pre- or post-focus), AFCPU 110 generates a drive signal to cause rotation of AF motor 109 in a direction such that focusing lens 103 approaches the in-focus point. The rotational motion of the AF motor is transmitted by a camera body transmission system consisting of gears provided in camera body 105 to camera body coupling 109a provided in a mount section of camera body 105, on which lens 100 is mounted. The rotational motion transmitted to camera body coupling 109a is further transmitted through lens transmission system 102 including lens coupling 101 (fitted with coupling 109a) and gears provided in lens 100, thus causing movement of lens 103 toward the in-focus position.

Lens 100 includes lens inner calculation and control means (lens CPU) 104, and it supplies necessary AF data such as the number of rotations of coupling 101 per unit displacement of lens 103 to AFCPU 110 through a lens contact provided in the mount section and camera body contact 106.

The focus control operation in AFCPU 110 will now be described in detail. All image outputs obtained from image sensors A and B in FIG. 21B are subjected to an image output shift as shown in FIGS. 22A and 22B to calculate the image shift extent. More particularly, denoting the image outputs of image sensors A and B by a0 to a39 and b0 to b39 (here n - 40), FIG. 22A shows a case when shift L is L=20, FIG. 22B shows a case when L=0, and FIG. 22C shows a case when L= −20. At each shifted position, the correlation of corresponding images of image sensors A and B is obtained to be compared to the extent of correlation concerning each shift position. A shift extent of the best correlation is determined to be the image shift extent. Lens 103 and other parts are driven according to a focus control operation, such as correlation calculation, to determine this image shift extent.

FIG. 22E shows a different way of expressing the method of determining such a shift. In the matrix of the Figure, points shown by a dot mark represent comparative picture elements. In this case, a shift number (i.e., shift extent) range of −20 to 20 constitutes the subject of calculation. The correlation calculation time is proportional to the number of blocks contained in this range. Problems in this calculation will now be discussed with reference to FIGS. 15 and 16.

FIG. 15 shows viewfinder screen 3100 of a single-lens reflex camera and its focus detection field. In the prior art, focus detection zone frame 3101 is so narrow that a depth to be described later does not enter the zone, and it is used for focus detection. In the in-focus state, image sensors A and B are located at positions equivalent to the narrow frame shown by the solid line in FIG. 15. Reference numeral 3102 designates marks provided in the viewfinder field in correspondence to a boundary in a detectable range. However, where focus detection can be effected in only a narrow focus detection area 3101, although there is no problem if there is an adequate pattern of a foreground object in focus detection zone 3101 as shown in FIG. 16A (FIGS. 16A and 16C showing the focus detection zone at the center of FIG. 15 on an enlarged scale, and FIGS. 16B and 16D showing output ai of image sensor A), if the pattern vanishes due to movement of the camera as shown in FIG. 16C, disability of focus detection results. In such a case, the photographing lens unnecessarily starts scanning, which is cumbersome.

Accordingly, in order to maintain and improve the accuracy of the correlation calculation noted above and also broaden the image area in the viewfinder field that is capable of focus detection, it is necessary to increase the number of picture elements (number of light-receiving elements), i.e., number of blocks in FIG. 22E, to thereby increase the focus detection area of the focus adjuster. However, increasing the number of picture elements to meet this requirement presents various problems as follows.

(1) With a wide focus detection area, there is a high possibility that foreground objects at different distances or depths are found in the area. Therefore, it is necessary to divide the wide focus detection area into a plurality of local focus detection areas and perform a focus control operation for each local focus detection area. In addition, there are problems concerning the division of the focus detection area.

(2) There are problems in the selection of defocus from among those of the local focus detection areas for indication and driving and in the manner in which the user's intention is to be reflected.

(3) There are problems accompanying the wideness of the focus detection area such as a problem of selecting a local focus detection area, with respect to which AGC (to be described later) is to be provided.

(4) Although increasing the image area capable of use for focus detection has a merit of increasing the shift (to be described later) during image correlation to permit an increased defocus area to be provided for focus detection, the prior art method of calculation is time-consuming.

Problems in (1) will be discussed.

First, the problems presented by the division of the focus detection area in the prior art method will be discussed.

As for one of image sensors A and B shown in FIG. 26, namely image sensor A, there are two well-known methods of division, i.e., a first method shown in ($\alpha$), in which local focus detection areas R1 to R3 free from overlap are defined, and a second method in ($\beta$), in which partly overlapped local focus detection areas R1' to R3' are defined. An example of focus control calculation is disclosed in U.S. Pat. No. 4,812,869. In this example, the method of image shift control calculation is changed when the defocus is large and when it is small. More specifically, when the defocus is large, the image shift is calculated by shifting all image outputs of image sensors A and B shown in FIG. 21B in a manner as shown in FIGS. 22A to 22C. When the defocus is small, on the other hand, image sensor A is divided to define overlapped local focus detection areas R1' to R3' as shown in FIG. 22D for detecting correlation between image sensors A and B.

Now, the two methods of division noted above will compared with respect to their merits and demerits. A case will be considered, in which a foreground object having a light intensity distribution as shown in FIG. 27A is projected on image sensor A. In this case, the image shift can be calculated by either of the methods ($\alpha$) and ($\beta$) in FIG. 26, with local focus detection area R2 and image sensor B in the former method and with local focus detection area R2' and image sensor B in the latter method. (The image shift can be detected when and only when there is a change in the light intensity distribution of the object.)

Now, a case will be considered, in which a foreground object light intensity distribution having an edge as shown in FIG. 27B is projected on image sensor A. In the division method ($\alpha$), the edge between bright and dark portions is just on the boundary between local focus detection areas R1 and R2. In this case of presence of a portion of large brightness change (i.e., large data amount) at an end of a focus detection area, the large brightness change portion is shifted out of and into the area when the shift of the optimum correlation is obtained by shifting the image signal projected on the other image sensor. This reduces the accuracy of image shift calculation. In the division method ($\alpha$), this applies to both detection areas R1 and R2 when there is an edge at the borderline between areas. That is, it is only when the edge is at this position that the accuracy of detection deteriorates, or disability of detection results.

With the division method ($\beta$), on the other hand, such an edge is completely contained at least in either area R1' or R2', and thus the above problem is not presented.

Now, a case will be considered, in which there is a depth or distance in an image. In such a case, an image as shown in FIG. 28A is projected on image sensor A, while an image as shown in FIG. 28D is projected on image sensor B. In this case, the close image areas and also the distant image areas can be overlapped by shifting areas, but the borderline areas can not be overlapped by shifting. Therefore, an area where close and distant images coexist can not be detected. First, when the image shown in FIG. 28A is projected on image sensor A, in the case of the division method ($\alpha$) the borderline between the close and distant images is found substantially at the borderline between areas R1 and R2. Thus, a close image can be detected using area R1, while a distant image can be detected using areas R2 and R3. In the case of the division method (β), images with depths are contained in both areas R1' and R2'. Therefore, detection is impossible in these area. Table 1A shows what is described above. FIGS. 28B and 28C show cases where the image on image sensor A is located at slightly shifted positions. Tables 1B and 1C show the possibility of detection in these cases.

TABLE 1

|   | R1 | R2 | R3 | R1' | R2' | R3' |
|---|---|---|---|---|---|---|
| A | close-range view | distant view | distant view | undetectable | undetectable | distant view |
| B | close-range view | undetectable | distant view | undetectable | undetectable | distant view |
| C | close-range view | undetectable | distant view | close-range view | undetectable | distant view |

It will be seen that in a case where there is a depth of image, the division method (α) of defining local focus detection areas without overlap has a higher possibility of detection. This is obvious from the fact that a depth found in overlap portions of local focus detection areas disables detection in both the areas. As is shown, the division methods (α) and (β) have their own merits and demerits.

Now, the problem in (2) concerning the selection of defocus among those of the local focus detection areas for indication and driving, will be discussed. When distant, intermediate and close range views of images are projected on image sensor A divided into local focus detection areas R1 to R7 as shown in FIG. 14, the photographer should determine the image to be focused. If the camera itself determines the view for focusing, it may sometimes go counter to the photographer's will. To be able to accurately focus an intended foreground it is necessary to set in advance a narrow focus detection area such that a depth will not enter the area.

In relation to this, Japanese Patent Laid-Open No. Sho 63-11906 proposes a system, in which focusing is effected according to the result of detection using three detection areas 3601 to 3603 provided in a viewfinder screen as shown in FIG. 19. In this case, there is a case when what can not be detected in central area 3601 can be detected in end area 3603. In such case, since the end area is spaced apart from the central area, there is a high possibility that a distant thing (for instance a tree outside a window) different from a thing in the central area (for instance a room wall) is focused.

The problem in (3) will now be described.

When continuous image sensor A (such as that with local focus detection areas R1 to R7 shown in FIG. 14) is used for detecting a plurality of foreground object images in a wide area, the brightnesses of the individual foreground objects may vary from one another extremely. In such a case, the way of providing AGC is important. Problems in this connection will be discussed.

First, a case is considered, in which there is A/D conversion capacity of about 8 bits for A/D converting analog image output into digital data to be stored in memory 113. With this order of dynamic range, if the brightness varies extremely, the output level can be optimized only for a portion of foreground objects through storage time control (i.e., through AGC). A case will now be considered, in which a wall with a poster applied thereto and a nearby window are projected on an image sensor for detecting a viewfinder screen central portion as shown in FIG. 17A. FIG. 17B shows a case when AGC is provided such that an image output in a predetermined central area is a predetermined peak (for instance 150), and FIG. 17C shows a case when AGC is provided such that the entire image output has a predetermined peak (for instance 150).

It will be seen that in the case of FIG. 17C the central image brightness is too low to be detected by corresponding local focus detection area R4 of the image sensor. Accordingly, the local focus detection area of image sensor A is shifted outwardly to areas R3, R5, R2 and R6, and focus detection first becomes possible in area R6. However, the photographer is thinking that naturally the poster at the center is focused. Therefore, there is a possibility of going counter to the photographer's will.

The problem in (4) will now be discussed.

As noted before in connection with the prior art, in the calculation of correlation between image sensors A and B the calculation time is substantially proportional to the number of blocks in FIG. 22E. In the example of FIG. 22E, the number of picture elements is 40 pairs. However, if this method is used where the number of picture elements is 80 pairs, the calculation time is increased to several times.

According to U.S. Pat. No. 4,636,624, the image on image sensor A is divided into three blocks as shown in FIG. 25, and when comparing image sensors A and B in an area of small defocus and small shift number L as shown in FIG. 23, correlation C(L) between the picture element row of the second block shown at β and data of image sensor B after shift is obtained, while for areas α and γ the correlation C(L) is calculated for the first and third blocks with respect to data of image sensor B after shift.

Here, the correlation C(L) is the value given as $$C(L) = \Sigma |a_i - b_{i+L}|$$

In this method, as shown in FIG. 23, the correlation is discontinuous at shift numbers corresponding to the borderlines between adjacent blocks.

SUMMARY OF THE INVENTION

An object of the invention is to provide an apparatus for performing highly accurate focus adjustment to suit the photographer's intention with respect to a great variety of foreground objects.

Another object of the invention is to provide a focus adjuster, which permits appropriate division of focus detection area, permits selection of an area division such as to reflect the photographer's intention and permits use of the result of previous focus adjustment for a subsequent focus adjustment.

To attain the above object of the invention, there is provided a first focus adjuster, which comprises:

(a) first and second light-receiving means each including a plurality of photoelectric converting elements in a uni-dimensional arrangement, said first and second light-receiving means providing respective light intensity distribution signals representing the intensity of light incident on said plurality of photoelectric converting elements;

(b) an optical system for leading a light flux from a view field to said first and second light-receiving means;

(c) selecting means for selecting a plurality of photoelectric converting elements adjacent to one another among the plurality of photoelectric converting elements of said first light-receiving means; and (d) calculating means for producing, according to the light intensity distribution signal of said selected plurality of photoelectric converting elements and also to a light intensity distribution signal of at least part of the plurality of photoelectric converting elements of said second light-receiving means, a signal representing a relation between the light intensity distribution over said selected plurality of photoelectric converting elements and light intensity distribution over at least part of the plurality of photoelectric converting elements of said second light-receiving means;

(e) said selecting means selecting said part of the plurality of photoelectric converting elements according to changes in said light intensity distribution signals in the direction of arrangement of said plurality of photoelectric converting elements of said first light-receiving means.

According to the invention, there is also provided a second focus adjuster, which comprises:

(a) a focus detection optical system for forming a pair of foreground object images on a detection surface from two light fluxes incident on a photographing lens from a foreground object through different optical paths and passed through said photographing lens;

(b) a first light-receiving element row consisting of a plurality of light-receiving elements provided on said detection surface, one of said pair foreground object images being projected on said first light-receiving row, said first light-receiving row generating a foreground object image signal corresponding to a light intensity distribution of said foreground object image;

(c) a second light-receiving element row consisting of a plurality of light-receiving elements provided on said detection surface, the other one of said pair foreground object images being provided on said second light-receiving element row, said second light-receiving row generating a foreground object image signal corresponding to a light intensity distribution of said foreground object image; and (d) detecting means for selecting a predetermined light-receiving element row from said first light-receiving element row, setting said predetermined light-receiving element row as stationary local focus detection area or progressively setting a light-receiving element row in an area resulting from a shift of said predetermined light-receiving element row as a mobile local focus detection area and detecting a relative shift between a foreground object image signal from said stationary or mobile local focus detection area and a foreground object image signal from said second light-receiving element row.

Further, to solve the problems in (1), in the second focus adjuster, the detecting means, when selecting the initial focus detection area, detects a change in the foreground object image signal between adjacent light-receiving elements of said first light-receiving element row in the neighborhood of a borderline between predetermined adjacent focus detection areas and sets a borderline of said initial focus detection area between adjacent light-receiving elements with less change in the foreground object image signal. In this case, the foreground object image signal may correspond to a foreground object image light intensity distribution difference. In other words, in the first image sensor focus detection areas without overlap, a borderline between adjacent local focus detection areas is made variable according to the brightness pattern of the foreground object, and a pattern portion having a great brightness change is prevented from being found on the borderline.

FIGS. 4 to 6A and 6B schematically show an example of the method and apparatus for solving the problems in (1).

In this example, 86 picture elements a1 to a86 of image sensor A of the first light-receiving element row is divided into seven local focus detection areas R1 to R7 in FIG. 5, and a plurality of borderlines are provided for each pair of adjacent areas.

When an image having light intensity change as shown in FIG. 4 is projected, a position at which there is no great change is selected as a borderline position. FIG. 6A shows a borderline portion between local focus detection areas R2 and R3 and an image on that portion on a scale enlarged in the abscissa direction. With respect to a foreground object image signal (image output) of light-receiving elements (picture elements) a22 to a26 in the neighborhood of the borderline, a difference $|a_i - a_{i+1}|$ as shown in FIG. 6B is calculated, and a borderline is determined to be at a position between elements a25 and a26, at which the difference is minimum.

With this arrangement, it is possible to prevent deterioration of the accuracy of focus detection.

To solve the problems in (2), the second focus adjuster is arranged such that the detecting means basically detects focus detection in a local focus detection area provided in the central portion of the first light-receiving element row and, when there is no foreground object image pattern capable of detection in the central local focus detection area, a pattern capable of focus detection is searched from the center toward the ends to effect focus detection with respect to a foreground object image pattern in a local focus detection area close to the center among patterns capable of focus detection. That is, center-preferential image shift calculation is performed.

More specifically, where the first light-receiving element row is constituted by a continuous light-receiving element row, central to end portions of the focus detection area of a wide image sensor are capable of foreground object image detection, and focus detection can be effected preferentially with a local focus detection area closer to the center. For example, focusing is effected preferentially not with a scene outside the window in FIG. 19 but with the window frame, and thus a foreground object closer to the center of the image sensor can be focused.

Further, to solve the problems in (3), the detecting means in the second focus adjuster provides a predetermined amount of AGC for focus detection basically in the central local focus detection area of the first light-receiving row. More specifically, if there is a foreground object image pattern capable of detection in the central local focus detection area of the image sensor (FIG. 17A), focusing in the central local focus detection area is possible by providing AGC with respect to this pattern. If there is no foreground object image pattern capable of detection in the central area (FIG. 18A), AGC is provided to the next local focus detection area (window frame in FIG. 18A) to the central area. In this way, optimum AGC can be provided to each local focus detection area.

To solve the problems in (4), the detecting means of the second focus adjuster, when selecting the predetermined light-receiving element row, selects a focus detection area including a light-receiving element row portion with a large foreground object image signal change among the first light-receiving element row as a stationary local focus detection area and effects focus detection from foreground object image signals from this stationary local focus detection area and the second light-receiving element row.

FIGS. 1 to 3 schematically show an example of the method and apparatus for solving the problems in (4).

In this example, image sensors A and B respectively have 86 picture elements a1 to a86 and b1 to b86. The detecting means first determines local focus detection area Ai (with a number of Mi of picture elements)--; with a large data amount from the entire area of image sensor A consisting of the first light-receiving element row. An area with a large data amount means an area having a great change in the image output of the foreground object image signal as shown at Ai in FIG. 1. An example of the method of determining a large data amount area will be described later. With respect to the picture element row of this selected local focus detection area Ai, correlation is calculated by progressively shifting the corresponding picture element row range of image sensor B. This method permits examination of shift L in the illustrated case in a range of −37 to 37.

In this way, this method permits obtaining an image shift by extracting a local focus detection area with a large data amount, and thus it is possible to detect a large shift range with a small amount of calculation. The number of picture elements Mi in the selected local focus detection area may be 10 to 20 to attain a predetermined accuracy of focus detection and is sufficiently 30 at the most. Therefore, dispensing with small data amount areas has no adverse effects.

FIGS. 2 and 3 show examples of the manner of shifting when selected local focus detection area Ai is other than the central area. It will be seen that there is no problem in the location of selected local detection area Ai, and likewise shift in a wide range can be coped with.

Further, unlike the prior art example shown in FIG. 23, where the focus detection area consists of three discrete blocks, the correlation C(L) varies continuously with shift L as shown in FIG. 24.

By way of example, the correlation in each shift in the case of FIG. 1 is $$C(L) = \sum_{i=38}^{49} |a_i - b_{i-L}| \text{ for } -37 \leq L \leq 37,$$

$$C(L) = \sum_{i=75}^{86} |a_{i+L} - b_i| \text{ for } -37 > L, \text{ and}$$

$$C(L) = \sum_{i=1}^{12} |a_{i+L} - b_i| \text{ for } +37 > L$$

BRIEF DESCRIPTION OF THE DRAWINGS

FIGS. 4 to 6A and 6B are views illustrating a method of local focus detection area borderline determination according to the invention;

FIGS. 11 to 13 are views illustrating a second embodiment of the invention;

FIGS. 14 to 19 are views for explaining center-preferential focus detection;

DESCRIPTION OF THE PREFERRED EMBODIMENTS

Now, a first embodiment of the focus adjuster according to the invention, which performs center-preferential image shift calculation, will be described.

Figure 20:
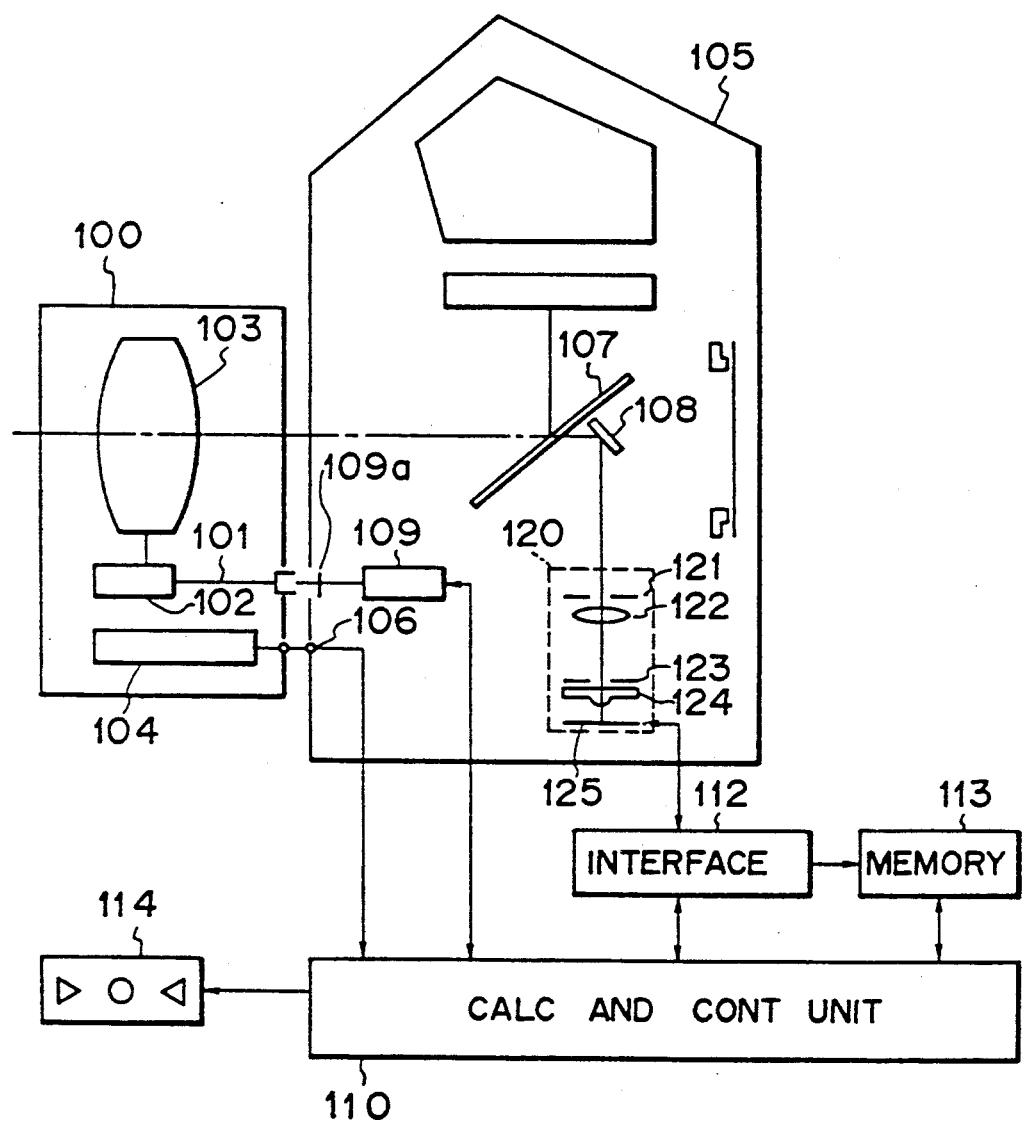
FIGS. 20, 21A to 21B are views illustrating a prior art focus adjuster.

The camera construction, to which the first embodiment is applied, is substantially the same as the prior art structure shown in FIG. 20, and hence it is not shown. The process performed in AFCPU 110 is different from the prior art process, and it will now be described.

Figure 7:
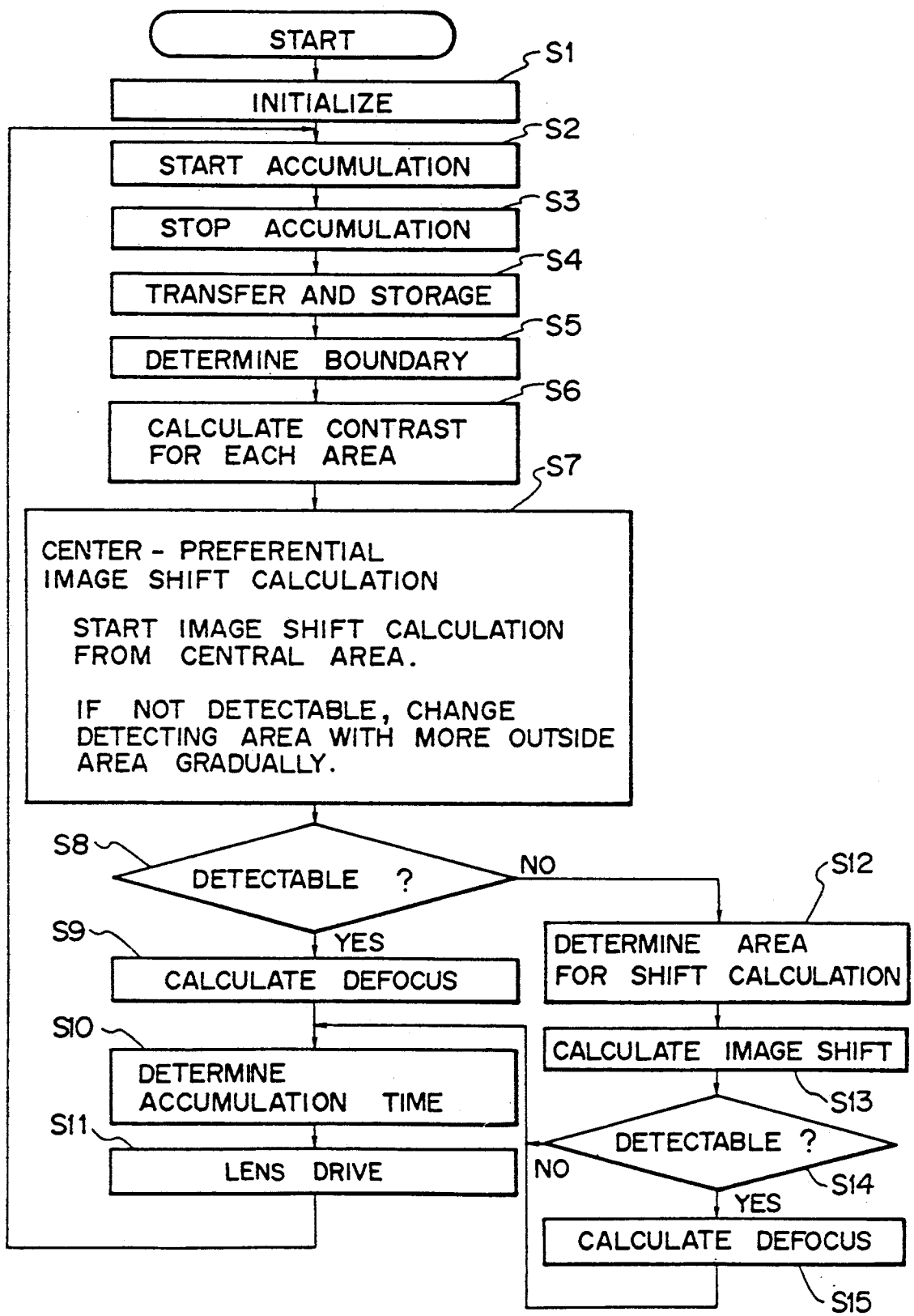
FIGS. 7 to 10 are views illustrating a first embodiment of the invention.
Figure 8:
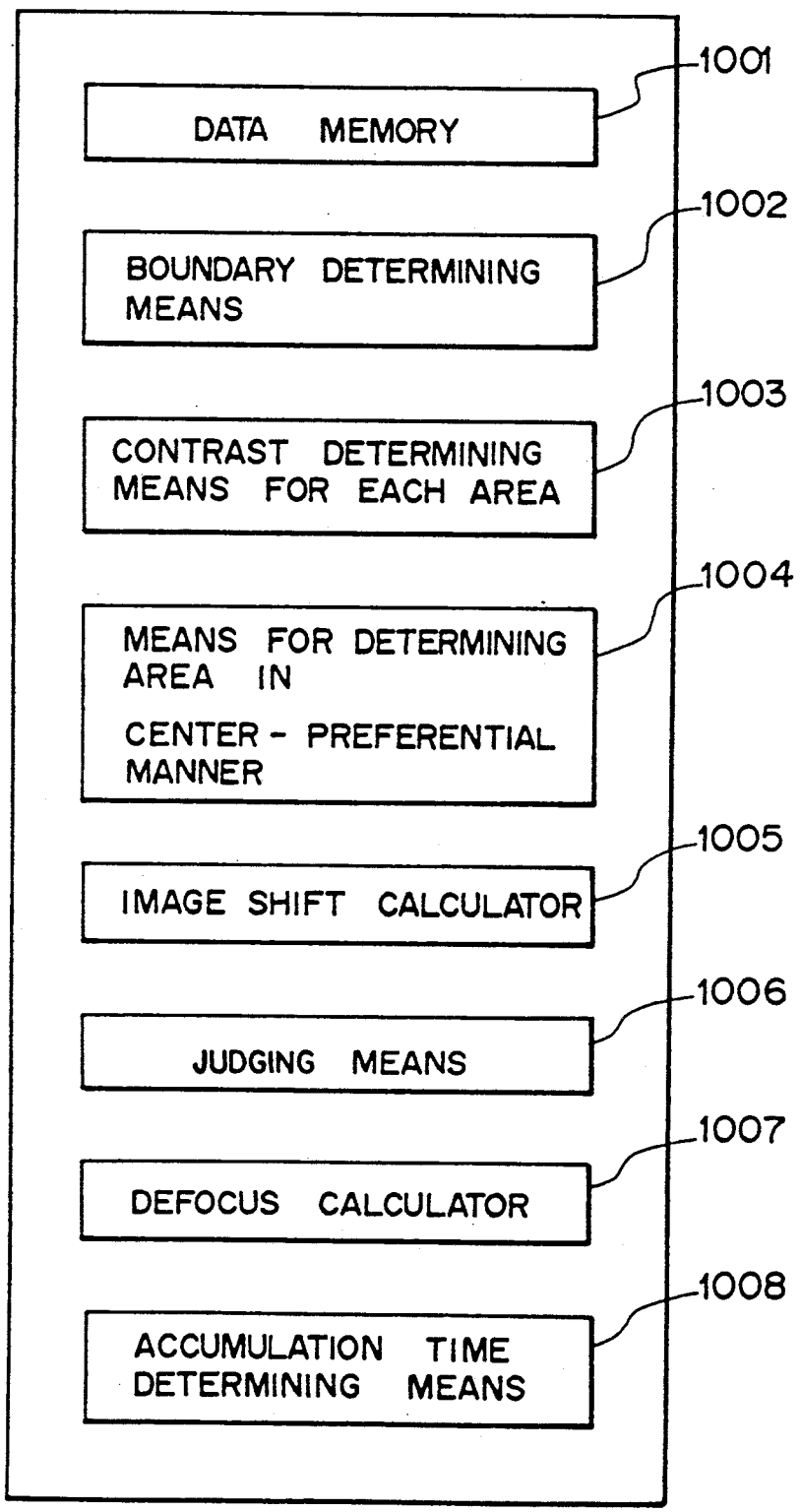

FIG. 7 is a flow chart of focus control performed by AFCPU (detecting means) 110, and FIG. 8 shows the construction of the AFCPU.

When power supply to the focus adjuster is started by turning on power supply to the camera or half depressing a release button, initialize step S1 in FIG. 7 is executed, in which is set a mode of setting the charge accumulation time according to the output of a monitor section (M2 in FIG. 21B) provided on a central portion of the image sensor.

There are two well-known methods of control of the charge accumulation time of a CCD image sensor, i.e., hardware AGC and software AGC. In the software AGC, the charge accumulation time and image output of the present time are used to determine the charge accumulation time of the next time. In the hardware AGC, with the start of charge accumulation the monitor section also starts charge accumulation. The monitor section output is detected at all times, and when the output reaches a predetermined value, the charge accumulation in the image sensor is ended.

Since there is no previous data at the time of start, the hardware AGC is selected because the software AGC results in slow convergence.

Figure 21A:
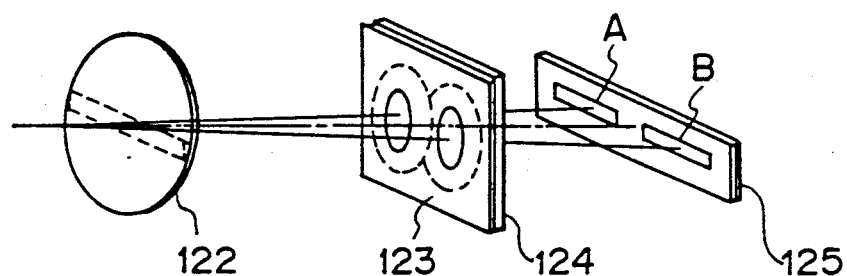
Figure 21B:
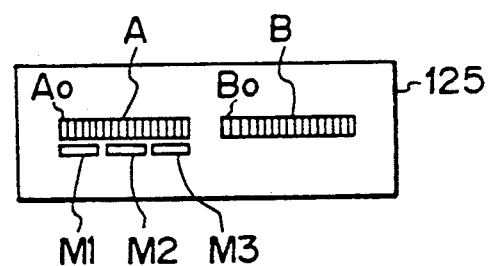
Figure 22A:
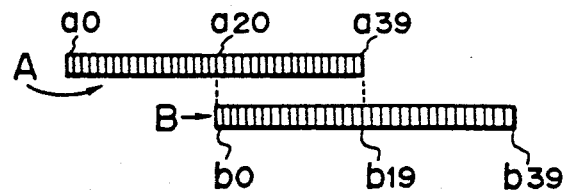
FIGS. 22A to 22E are views illustrating correlation in the prior art.
Figure 22B:
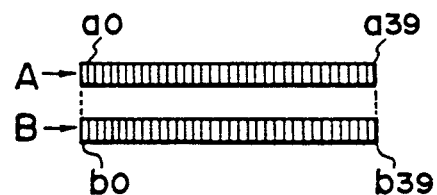
Figure 22C:
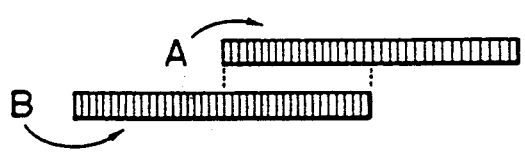
Figure 22D:
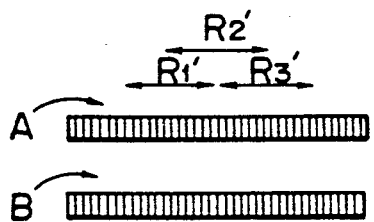
Figure 22E:
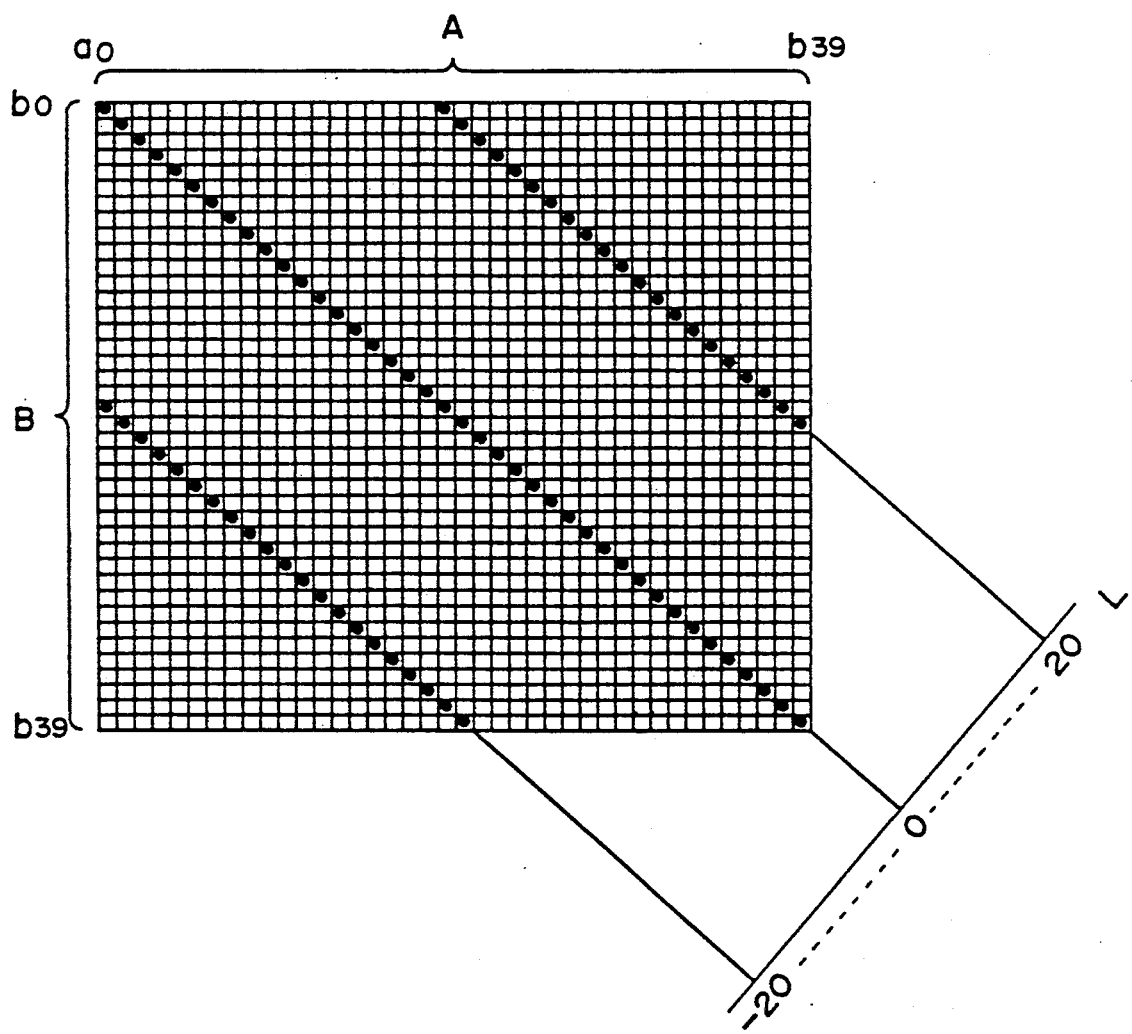
Figure 23:
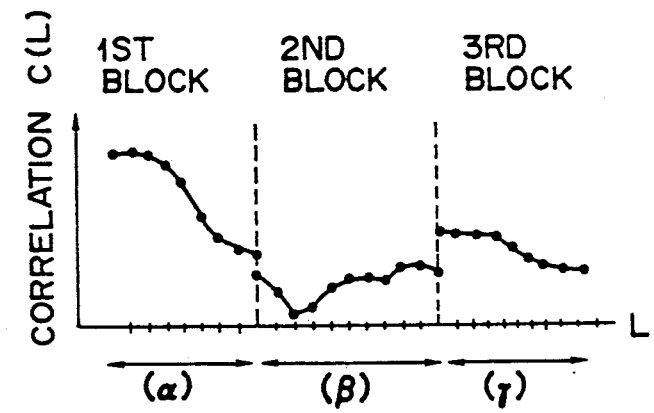
FIGS. 23 and 25 are views illustrating the division of focus detection area in the prior art.
Figure 24:
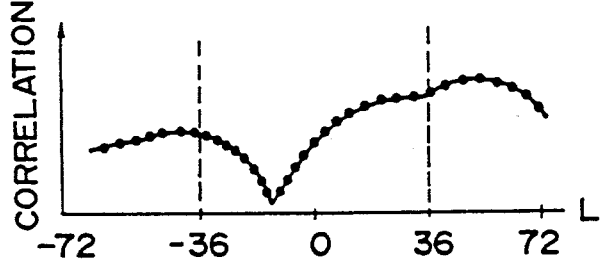
FIG. 24 is a view showing an image sensor output when local focus detection areas are defined without overlap.
Figure 25:
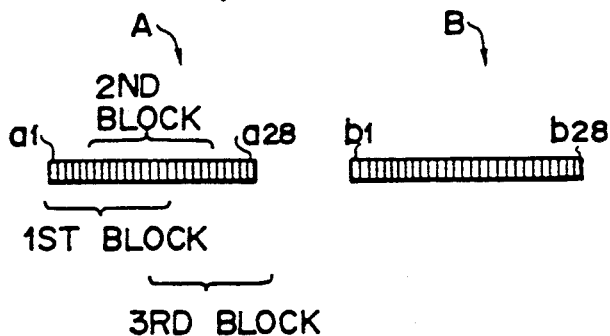
Figure 26:
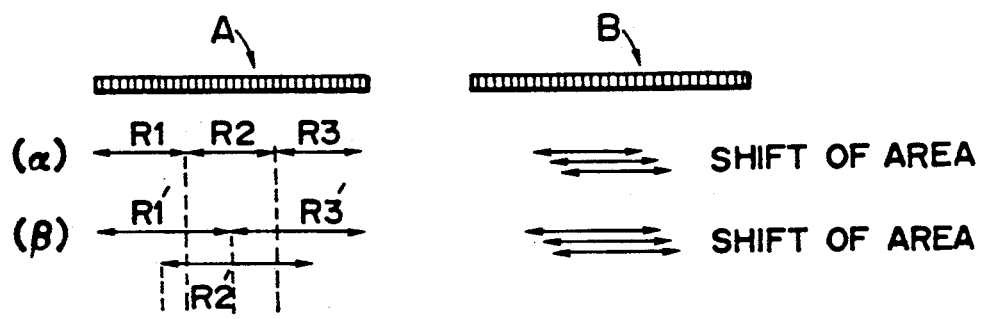
FIGS. 26 to 28D are views for explaining focus detection with--; local focus detection areas defined without overlap and with overlap.
Figure 27A:
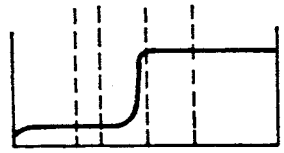
Figure 27C:
Figure 27B:
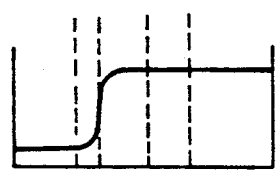
Figure 28A:
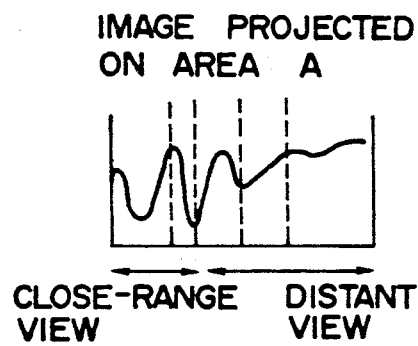
Figure 28D:
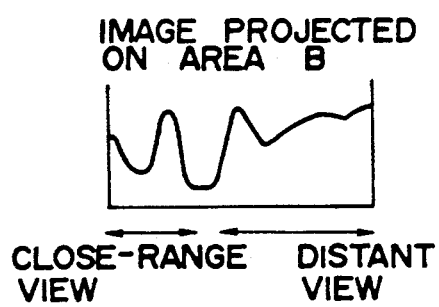
Figure 28B:
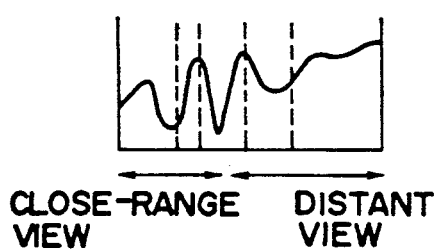
Figure 28C:
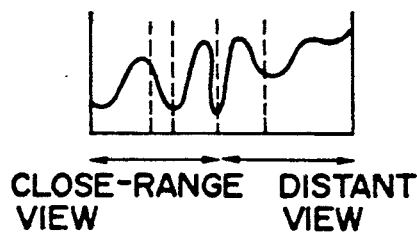

In this embodiment, three monitor sections M1 to M3 are disposed in a row in parallel to image sensor A as shown in FIG. 21B. AFCPU 110 can select either one of monitor sections M1 to M3 as hardware AGC.

In the hardware AGC, however, it is possible that the image output of a foreground object image projected on an area in question is not adequate, for instance there is an overflow, due to possible imperfectness of correspondence between observation of average light amount in a wide area and observation of a local focus detection area. Therefore, in the second and following times, the software AGC is used (step S10).

After the niliatying, the accumulation is started in step S2 and stopped in step S3. In step S4, image data is A/D converted in interface 112 and stored in memory 113. As the image data stored in the memory, data of the differences between adjacent element outputs obtained over the entire image sensor or data obtained by filtering the image sensor output and thus cutting out predetermined space frequency components may also be used.

Further, it calculates maximum and minimum values M(r) and S(r) in each area and stores these values in the memory areas corresponding to the individual elements shown in Table 2A.

TABLE 2A

| PARTIAL AREA | r | FIRST ELEMENT p (r) | LAST ELEMENT q (r) | MAX M (r) | MIN S (r) | CTRS Cnt (r) | INFO AMT E (r) | IMAGE DEVIATION Z (r) | DEFOCUS DEF (r) | OFFSET O (r) | k (r) |
|---|---|---|---|---|---|---|---|---|---|---|---|
| R1 | 1 | 1 | 12 | | | | | | | 68 | 9.2 |
| R2 | 2 | 13 | 24 | | | | | | | 55 | 9.5 |
| R3 | 3 | 25 | 37 | | | | | | | 40 | 9.8 |
| R4 | 4 | 38 | 49 | | | | | | | 30 | 10 |
| R5 | 5 | 50 | 63 | | | | | | | 42 | 9.8 |
| R6 | 6 | 64 | 75 | | | | | | | 58 | 9.5 |
| R7 | 7 | 76 | 86 | | | | | | | 72 | 9.2 |

Figure 6A:
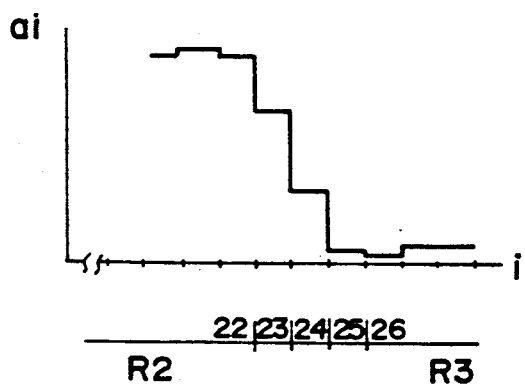
Figure 6B:
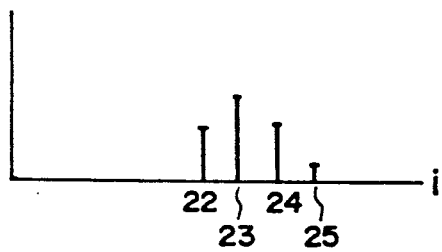

In step S5, boundary determining means 1002 determines local focus detection area borderlines or boundaries by the method as described before. More specifically, with respect to initial value Q(r) of the last element of a predetermined area as shown in Table 2B, image output a in its neighborhood is compared in the following program to determine the boundary between local focus detection areas as described before in connection with FIG. 6.

(Local focus detection area boundary determination program)

TABLE 2B

| r | INITIAL VALVE OF LAST ELEMENT Q (r) |
|---|---|
| 1 | 13 |
| 2 | 25 |
| 3 | 37 |
| 4 | 49 |
| 5 | 61 |
| 6 | 73 |
| 7 | |

```
FOR r = 1 TO 6
   FOR j = -2 TO 1
       l = Q(r) + j
       D_l = |a_l - a_{l+1}|
       IF j = -2 THEN q(r) = l
       IF j ≠ -2 AND D_l < D_{l-1} THEN q(r) = l
   NEXT j
NEXT r
```

The start element p(r) and end element q(r) of each local focus detection area boundary thus determined are stored in memory areas R1 to R7 corresponding to the individual elements shown in Table 2A.

In step S6, contrast determining means 1003 calculates contrast Cnt(r) of each area (r being variable) as $$Cnt(r) = \sum_{i=p(r)}^{q(r)-1} |a_i - a_{i+1}|$$

and stores the result in the memory area corresponding to each element shown in Table 2A.

Figure 9:
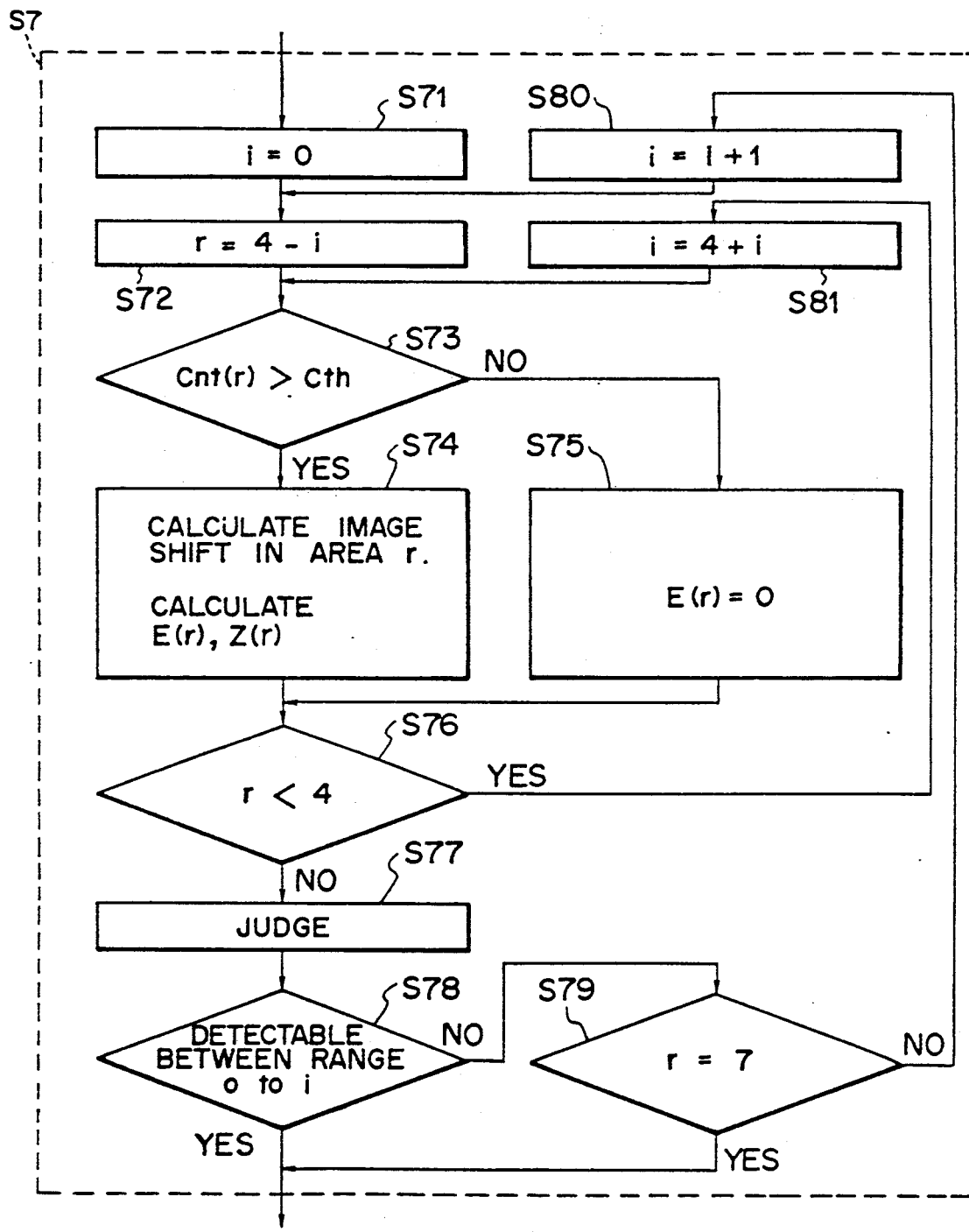

In step S7 (described in detail in FIG. 9), center-preferential image shift calculation is performed. To this end, center-preferential area determining means 1004 designates local focus detection areas progressively from central local focus detection area R4 as shown in FIG. 9 (steps S74 and S77).

In steps S71 and S72, local focus detection area of r=4 is selected, and in step S73 a check as to whether the contrast of the designated area is sufficient is done from Cnt(r)>Cth. If the contrast is sufficient, step S74 is calculated, in which image shift calculating means 1005 calculates image shift Z(r) and data amount E(r) by a predetermined method to be described later. If the contrast is insufficient, the data amount is set to E(r)=0, and the routine then goes to step S76.

Step S76, is provided for permitting the judgement of the next result after end of image shift calculation in opposite side areas equidistant from the central area. If r=4, step S77 is executed.

In step S77, judging means 1006 performs judgement of the result according to the magnitude of the data amount as shown in Table 3.

TABLE 3

| i | Content of judgement of result | Defocus DEF |
|---|---|---|
| 0 | FI = 1 (detectable) if E(4) > Eth 1.<br>FI = 0 (undetectable) otherwise. | FI = 1: DEF = DEF(4) = K(4) × Z(4) + O(4) |
| 1 | FI = 10 if E(3) > Eth 1 and E(5) > Eth 1.<br>FI = 11 if E(3) > Eth 1 and E(5) ≦ Eth 1.<br>FI = 12 if E(3) ≦ Eth 1 and E(5) > Eth 1.<br>In case E(3) ≦ Eth 1 and E(5) ≦ Eth 1,<br>FI = B if E(3) + E(4) + E(5) > Eth 2.<br>FI = 0 (undetectable) otherwise. | FI = 10: DEF = Near {DEF(3), DEF(5)}<br>FI = 11: DEF = DEF(3)<br>FI = 12: DEF = DEF(5)<br>FI = 13: DEF is a combination of DEF(3), DEF(4), and DEF(5) |
| 2 | FI = 20 if E(2) > Eth 1 and E(6) > Eth 1.<br>FI = 21 if E(2) > Eth 1 and E(6) ≦ Eth 1.<br>FI = 22 if E(2) ≦ Eth 1 and E(6) > Eth 1.<br>In case E(2) ≦ Eth 1 and E(0) ≦ Eth 1,<br>FI = 23 if E234 > Eth 2 and E456 > Eth 2,<br>FI = 24 if E234 > Eth 2 and E456 ≦ Eth 2,<br>FI = 25 if E234 ≦ Eth 2 and E456 > Eth 2,<br>where E234 = E(2) + E(3) + E(4) and E446 = E(4) + E(5) + E(6).<br>FI = 0 (undetectable) otherwise. | FI = 20: DEF = Near {DEF(2), DEF(6)}<br>FI = 21: DEF = DEF(2)<br>FI = 22: DEF = DEF(6)<br>FI = 23: DEF is a closer one to camera of a combination of DEF(2) to DEF(4) and combination of DEF(4) to DEF(6)<br>FI = 24: DEF is a combination of DEF(2) to DEF(4)<br>FI = 25: DEF is a combination of DEF(4) to DEF(6) |

TABLE 3-continued

| i | Content of judgement of result | Defocus DEF |
|---|---|---|
| 3 | FI = 30 if E(1) > Eth 1 and E(7) > Eth 1. | FI = 30: DEF = Near {DEF(1), DEF(7)} |
|   | FI = 31 if E(1) > Eth 1 and E(7) ≦ Eth 1. | FI = 31: DEF = DEF(1) |
|   | FI = 32 if E(1) ≦ Eth 1 and E(7) > Eth 1. | FI = 32: DEF = DEF(7) |
|   | In case E(1) ≦ Eth 1 and E(7) ≦ Eth 1, | FI = 33: DEF is a closer one to camera of a combination of DEF(1) to DEF(3) and a combination of DEF(5) to DEF(7) |
|   | FI = 33 if E123 > Eth 2 and E567 > Eth 2, |  |
|   | FI = 34 if E123 > Eth 2 and E567 > Eth 2, |  |
|   | FI = 35 if E123 ≦ Eth 2 and E567 > Eth 2, | FI = 34: DEF is a combination of DEF(1) to DEF(3) |
|   | where E123 = E(1) + E(2) + E(3), | DEF is a combination of DEF(5) to DEF(7) |
|   | E567 = E(5) + E(6) + E(7). |  |
|   | FI = 0 (undetectable) otherwise |  |

With $r=4$ ($i=0$), detection is possible if data amount E(4) is greater than Eth 1. In this case, FI=1 is set. If the data amount is smaller, the detection is impossible. In this case, FI=0 is set. When FI=1, the value of DEF(4) in area $r=4$ is determined as defocus DEF in defocus calculation step S9 to be described later.

In step S78, a check as to whether detection is possible is made by checking whether FI>0. If the detection is possible, step S8 is executed. Otherwise, a check is done in step S79 as to whether all the local focus detection areas are checked. If all the areas are checked, next step S8 is executed even if these areas are all incapable of detection.

If there are areas remaining without being checked, i is set to $i=i+1$ in step S80 (i.e., $i=1$), in step S72 an area of $r=4-i$ (in the instant case $r=3$) is designated. Then as before, the routine goes through steps S73, S74 and S75 to step S76. Since $r=3$, step S81 is executed. Then, with $r=4+i$ the routine goes through steps S73, S74 and S75 to step S76 as before.

Since this time $r=5$, next step S77 is executed. At this time, the data amount is certified with respect to areas of $r=3$ and $r=4$.

This time, the judgement of result in case of $i=1$ will be described with reference to Table 3.

If both E(3) and E(5) are both greater than Eth 1, FI=10 is set, and in defocus calculation in step S9 to be described later either DEF(3) or DEF(5) that corresponds to a foreground object closer to the camera is adopted as defocus DEF.

If either E(3) or E(5) is greater than Eth 1, FI=11 is set. If E(5) is greater than Eth 1, FI=12 is set. In the defocus calculation in step S9 to be described later, DEF(3) and DEF(5) are set as defocus DEF in the respective former and latter cases.

If the predetermined value is met by none of the data amounts, the sum of data amounts with respect to all the detection areas, for which the calculation has been done, or a plurality of detection areas among all the detection areas, in which calculation has been done, is obtained. If the sum is greater than Eth 2, FI=13 is set, and in the defocus calculation in step S9 to be described later, a combination of DEF(3), DEF(4) and DEF(5) is obtained as defocus DEF. Otherwise, FI=0 is set (incapable of detection).

Then, in step S78 whether the detection is possible is checked by checking whether FI>0. If the detection is possible, step S8 is executed. If the detection is impossible, whether all the local focus detection areas have been checked is checked in step S79. If all the areas have been checked, next step S8 is executed even if the detection is impossible in all the areas.

If there are remaining areas, $i=i+1$ ($i=2$ in the instant case) is set in step S80, and in step S72 $r=4-i$ ($r=2$ in the instant case) is The routine then goes through steps S73, S74 and S75 to step S76 as before.

Since $r=2$, step S81 is executed to set $r=4+i$ ($r=6$ in the instant case). The routine then goes through steps S73, S74 and S75 to step S76 as before.

Like process is repeatedly executed.

Here, the content of image shift calculating means 1005 in step S74 will be described.

There are various well-known methods of obtaining relative displacement of images from a pair of image outputs, and these methods may be used. Here, a method described in U.S. Pat. No. 4,561,749 by the applicant will be described.

As an example, local focus detection area R3 ($r=3$) will be described. When this area corresponds to outputs a25 to a37 in Table 2A, the correlation C(L) corresponding to L picture element shift is $$C(L) = \sum_{\substack{i=s \\ i-j=L}}^{f} |a_i - b_j|$$

$$s = p(r) + (L \times 0.5), \quad (r = 3: p(3) = 25)$$
$$f = q(r) + (L \times 0.5), \quad (r = 3: q(3) = 37)$$

where [Y] is a greater integer smaller than Y. (for example, in case Y=3.5, [Y]=3.)

Figure 10:
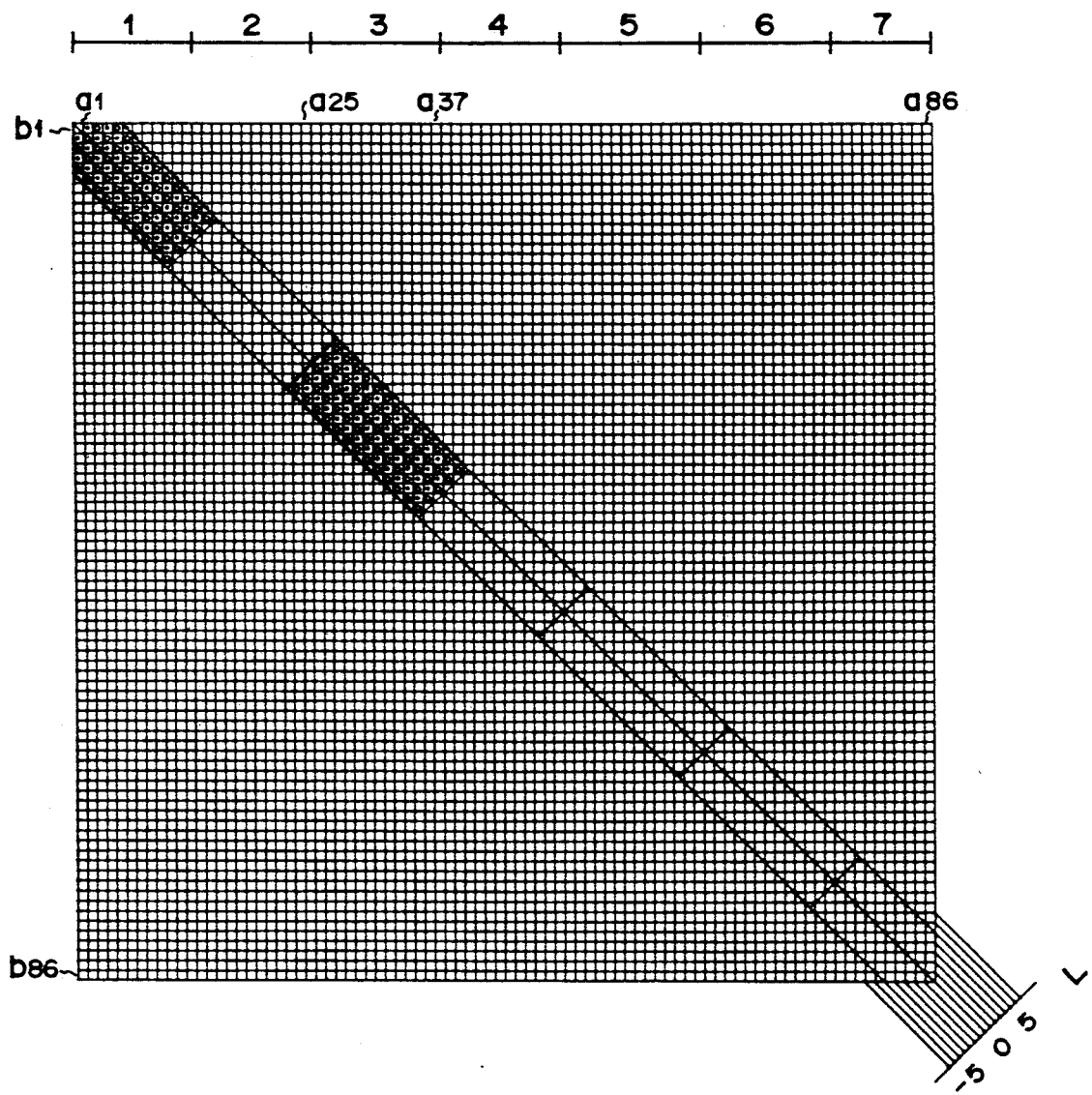

In this way, correlation is obtained with respect to each picture element shift L as shown in FIG. 10. The shift L may be about ±5 to ±10. (In this case, the detection area of image sensor A is referred to as a mobile local focus detection leave parenthesis in). Further, in end elements of $r=1$ and $r=7$ there is no shifted corresponding picture element. These end elements are omitted from the addition as shown in FIG. 10. (That is, detection is not performed in out-of-focus areas.)

Then, with respect to three successive correlations C(L−1), C(L) and C(L+1), $$D = (C(L-1) - C(L+1))/2$$

$$E = MAX(C(L-1) - C(L), C(L+1) - C(L))$$

$$Cext = C(L) - |D|$$

$$Cmin = Cext / E$$

are calculated with respect to shift L such that
C(L−1) ≧ = C(L) and C(L+1) > C(L).

Further, standardized correlation Cmin is obtained by varying the value of L, and it is compared to a predetermined value, for instance 0.4. If the correlation is greater, it is determined to be a true correlation position. Of course, it is possible to cause shift in the entire range to find out Cext and Cmin and determine it to be a maximum correlation position.

Value E in this maximum correlation position is the data amount, and if this value becomes smaller, the accuracy of focus detection can no longer be guaranteed.

Using this maximum correlation shift, the image shift can be calculated from $Z = L + D/E$.

Referring back to FIG. 7, in step S8, a check is done as to whether focus detection in a local focus detection area was possible in step S7. If it was, the defocus is calculated in step S9. The defocus calculation has been described before in connection with Table 3, and a supplementary description will be given hereinunder.

The defocus in each detection area is calculated as $$DEF(r) = Z(r) \times k(r) + O(r)$$

using image shift $Z(r)$ detected in each detection area and off-set $O(r)$ and conversion coefficient $k(r)$ stored in memory as shown in Table 2. The conversion coefficient $k(r)$ varies with individual local focus detection areas due to characteristics of the optical system for focus detection, and predetermined values are stored in advance for the individual local focus detection areas. Off-set $O(r)$ varies depending on the status of adjustment of a body in which the focus adjuster is mounted, and it is written in EEPROM or the like for each body.

The manner of selection of one of a plurality of image shift calculation results was described before when at least one of $E(r)$ is above Eth 1 (Table 3).

Now, a case will be considered, in which there is no area where E is above Eth 1, i.e., FI=13. (Some description was given before in this connection.) In this case, the data amount is insufficient in a single area. However, focus detection is possible if sum E345 of data amounts of a plurality of areas is above Eth 2. A specific method of calculation may be $$DEF = DEF(3) \times E(3)/E345 + DEF(4) \times E(4)/E345 + DEF(5) \times E(5)/E345$$

where $E345 = E(3) + E(4) + E(5)$.

where E345=E(3)+E(4)+E(5).

Likewise, when the detection area is increased (i=2 and i=3) if there is no area with E above Eth 1, defocus DEF is synthesized according to the sum of data amounts of a plurality of local focus detection areas as shown in Table 3.

If it is determined in step S8 that all the local focus detection areas are incapable of detection, step S12 is executed. If the defocus is large again, a corresponding image shift calculation area is determined. In this case, since the pertinent area is not in the neighborhood of focus, search has to be made for a satisfactory correlation over a wide shift range.

In this case, all the focus detection areas may be used for calculation. However, the calculation time may be reduced by selecting a local focus detection area of the greatest contrast Cnt(r) among areas R1 to R7 and detecting the shift as the stationary local focus detection area as described before in connection with FIG. 1. Further, if the image is dimmed greatly because of large defocus so that the contrast is below a predetermined value even in an area where the contrast Cnt(r) is highest, a combination of this highest contrast area and opposite side areas is handled as one area (which corresponds to detection area Ai in FIG. 1). In this case, the number of picture elements exceeds 30, so that it is possible to cope with even great dimness.

Figure 1:
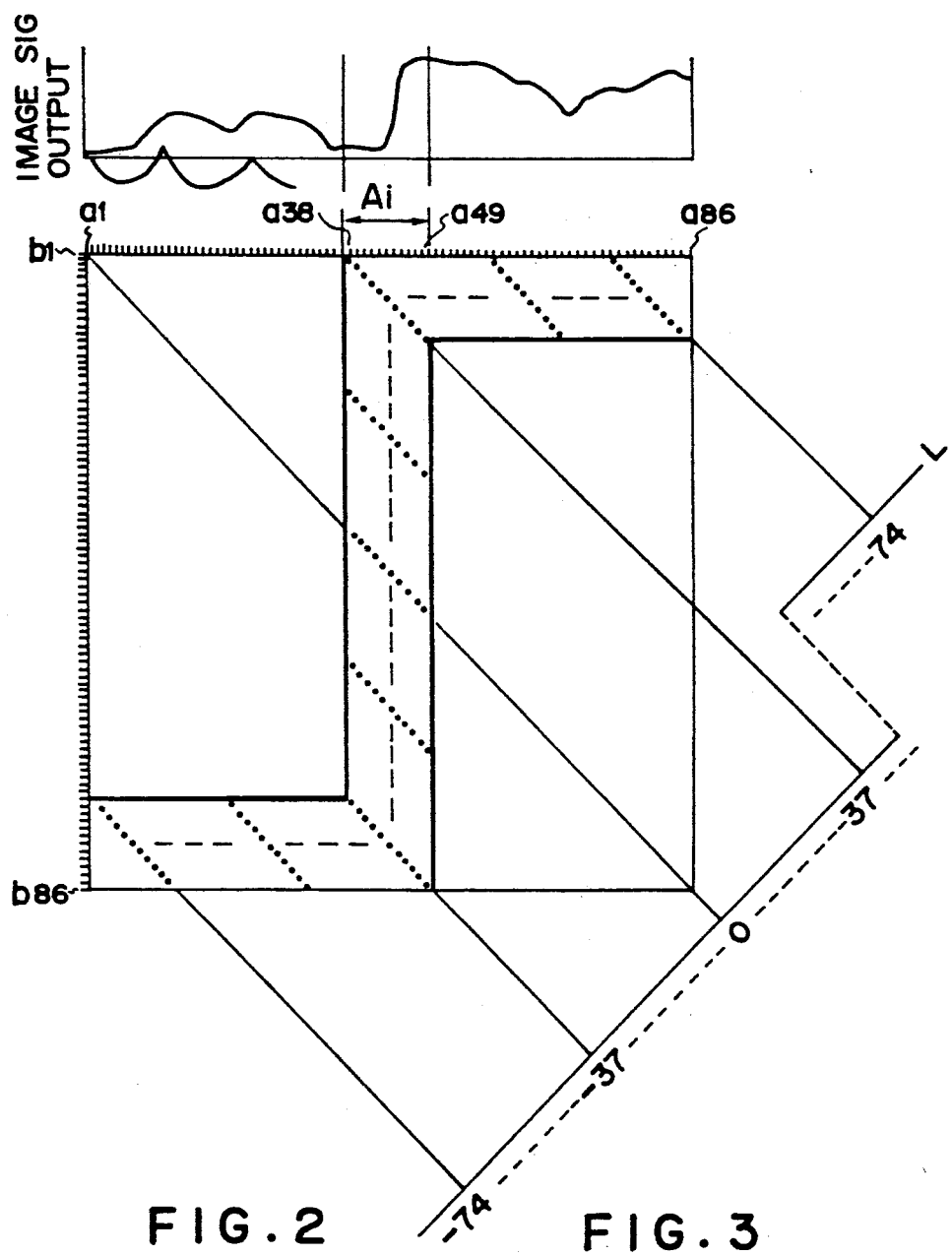
FIGS. 1 to 3 are views illustrating the method of correlation calculation with a focus adjuster according to the invention.
Figure 2:
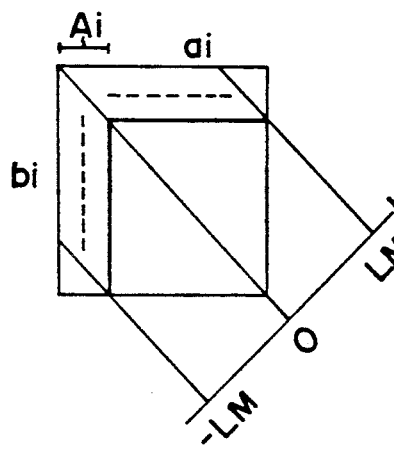
Figure 3:
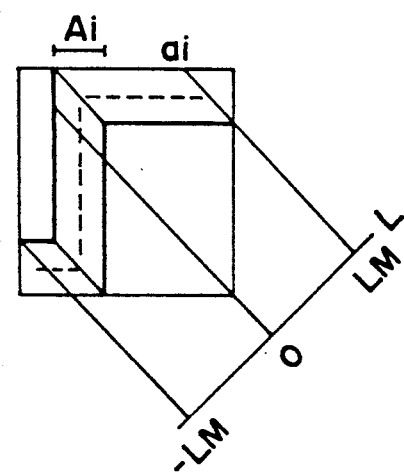

More specifically, the area of maximum contrast Cnt(r) is selected in step S12, and if the contrast is above a predetermined value, this area is determined as a stationary local focus detection area corresponding to detection area Ai in FIG. 1. If the contrast is below the predetermined value, a combination of this area and opposite side areas is determined to be a stationary local focus detection area corresponding to area Ai in FIG. 1.

In step S13, image shift calculation is performed to obtain data amount and image shift. If no maximum correlation position is found or if the data amount is below a predetermined value, the detection is impossible. In this case, therefore, a low contrast flag is set, and the routine goes through step S14 to step S10. If the detection is possible, the routine goes through step S14 to step S15 to calculate the defocus, and then it goes to step S10.

In step S10, the accumulation time for the next time is determined depending on the local focus detection areas (i=0, 1, 2 or 3) used for the result judgement and according to image output data corresponding to these areas such that the next time peak in that area has a predetermined value.

In step S11 lens drive is executed according to the calculated defocus, and when the driving is completed, accumulation is started in step S2. However, if it is detected in step S14 that the detection is impossible, simultaneously with the start of drive the accumulation is started in step S2 to search the lens position at which the detection is possible.

Now, a second embodiment of focus adjuster will be described, in which designation-preferential image shift calculation is performed as a modification of the center-preferential image shift calculation.

In the center-preferential image shift calculation system, the result of calculation with respect to the central area is used preferentially, and if the detection is impossible in the central area, the detection area is progressively broadened from the central area for focus detection calculation. In the designation-preferential image shift system, the result of image shift calculation with respect to a designated detection area is used preferentially, and when the detection is impossible in the designated detection area, the detection area is progressively broadened from the designation-preferential detection area for focus detection calculation.

To this end, the photographer designates a focus detection area by some means.

An example of such area designation will now be described with reference to FIG. 11A. Description of parts shown in FIG. 20 corresponding to the first embodiment is omitted. In this example, switches I to III are provided as detection area selection members on top of a shutter release button. Thus, area switching can be effected momentarily without separating hand from the shutter release button.

First, a normal shutter release operation will be described. When member 151 is depressed into contact with member 152 to render the potential at input port I2 of microcomputer 110 H (high) for performing operation control, a commonly termed talf depression state is set up to start focus detection operation. When member 151 is further depressed so that member 153 is turned on, a full-depressed state is set up, in which the potential at input port I1 is state H. As a result mirror-up and exposure are started. Switches I to III provided as area selection members on top of the shutter release button may be small mechanical switches, contact switches or pressure-sensitive switches. In either case, the potentials at input ports I3 and I4 are changed between H and L (low) according to the on-off operation of switches I to III.

Of course, with mechanical switches the on-off operation should be possible with lighter touch than in the case of the half- and full-depression noted above. With contact switches and pressure-sensitive switches predetermined circuit members are inserted between adjacent ones of input ports I3 to I5. The detection area selection may be effected in correspondence to an "on" switch; for instance, a central area is selected as shown in FIG. 11B, a left area is selected as shown in FIG. 11C, and a right area is selected as shown in FIG. 11D. However, this manner of selection is difficult if switches I to III are smaller than finger tip as shown.

Accordingly, as shown in Table 4A, preference is given to the left detection area when switch I is in state H irrespective of the state of the other switches, to the central detection area when switches I and II are respectively in states L and H irrespective of the state of other switches, and to the right detection area when switches I to III are respectively in states L, L and H. In such arrangement, the left, central and right detection areas can be selected with respective finger positions shown in FIGS. 11E to 11G, thus improving the operability.

FIGS. 11E to 11G are views from the back side (film side) of a camera. The preferential detection area is constituted by left local focus detection area (1) in the viewfinger filed in FIG. 11H with the finger position of FIG. 11E, by central local focus detection area (2) in the viewfinger field in FIG. 11H with the finger position of FIG. 11F, and by right local focus detection area (3) in the viewfinder field in FIG. 11H with the finger position shown in FIG. 11G.

Table 4B shows an arrangement which may be adopted when the number of selectable detection areas is increased by increasing switches. Here, mark * means either state H or L as desired.

Figure 12A:
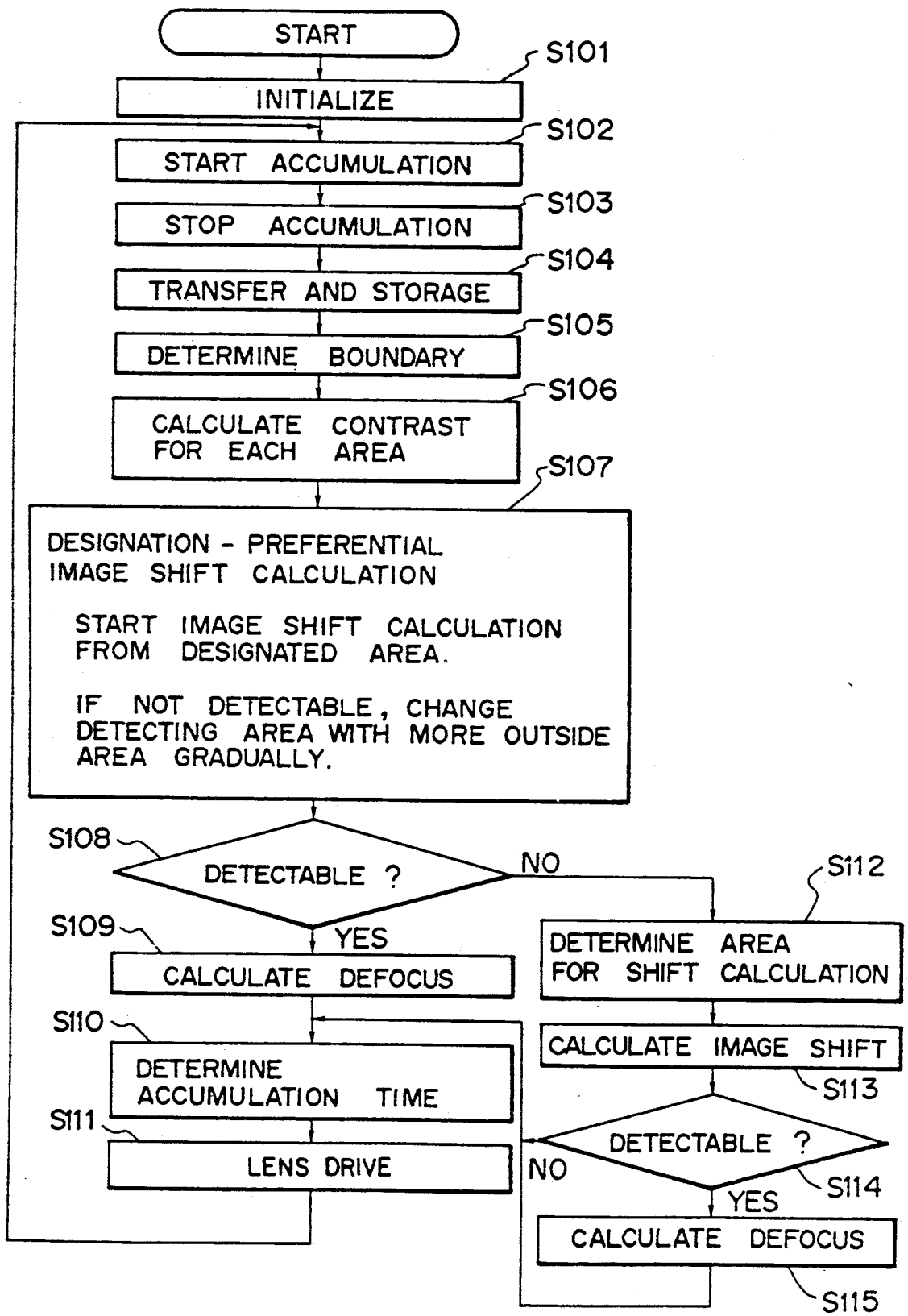

Now, flow of operation of the designation-preferential image shift calculation system will be described with reference to FIG. 12A.

This flow is the same as the flow shown in FIG. 7 except that designation-preferential image shift calculation is performed in step S107.

In initialize step S101, the states of input ports I3 to I5 are read out, and a preferential area is determined on the basis of the determination standards in Table 4A. One of monitor sections M1 to M3 shown in FIG. 21B, on the basis of which the hardware AGC is to be applied, is determined by whether the preferential detection area is either R2 or R4 or R6.

TABLE 4A

| I | II | III | Determination |
|---|----|-----|---------------|
| H | * | * | Preference for R2 (left) |
| L | H | * | Preference for R4 (central) |
| L | L | H | Preference for R6 (right) |

TABLE 4B

| I | II | III | IV | V | VI | VII | Determination |
|---|----|-----|----|---|----|-----|---------------|
| H | * | * | * | * | * | * | Preference for R1 |
| L | H | * | * | * | * | * | Preference for R2 |
| L | L | H | * | * | * | * | Preference for R3 |
| L | L | L | H | * | * | * | Preference for R4 (central) |
| L | L | L | L | H | * | * | Preference for R5 |
| L | L | L | L | L | H | * | Preference for R6 |
| L | L | L | L | L | L | H | Preference for R7 |

The stop of first accumulation in step S103 is determined according to the output of the designated monitor. The second and following accumulation stops are controlled according to the setting of the accumulation time in step S110.

Steps S104 to S106 are the same as described before.

Figure 13:
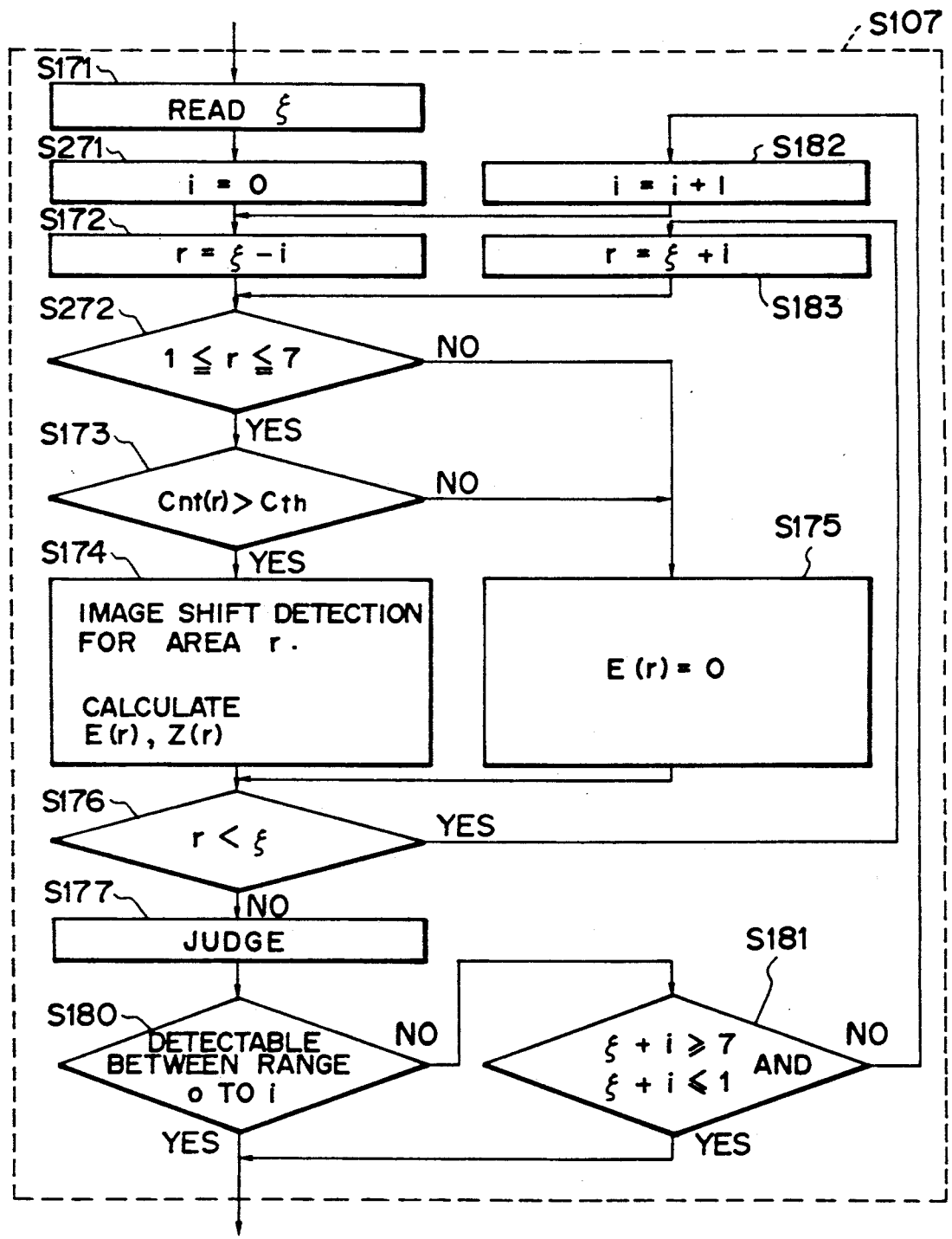
Figure 14:
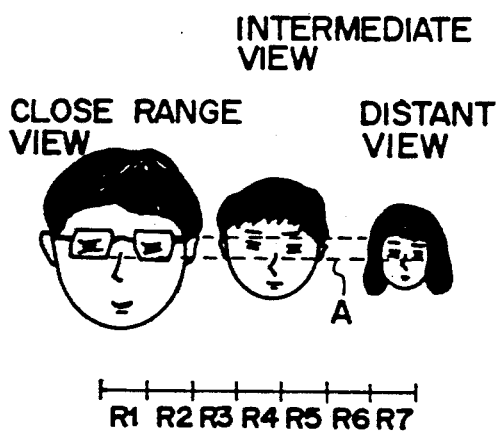
Figure 15:
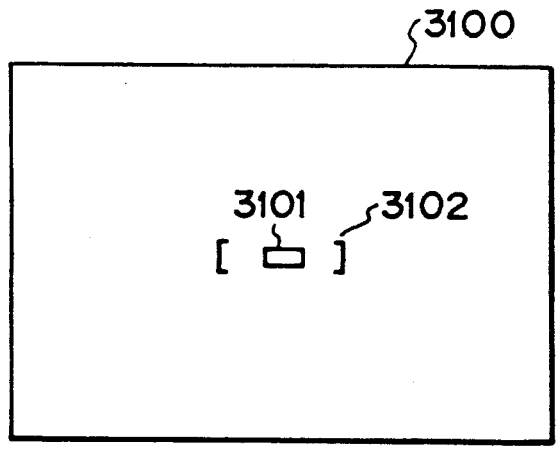
Figure 16A:
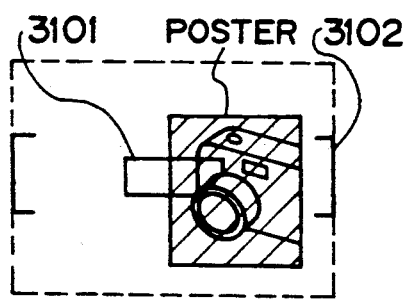
Figure 16B:
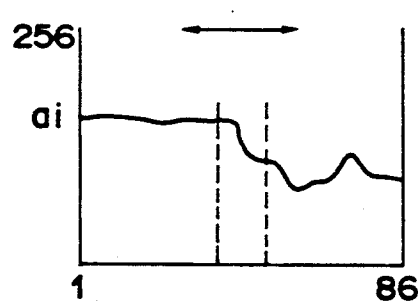
Figure 16C:
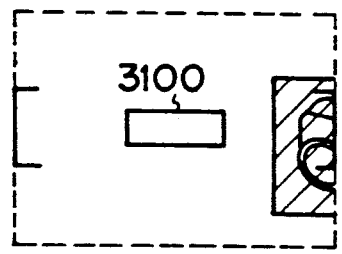
Figure 16D:
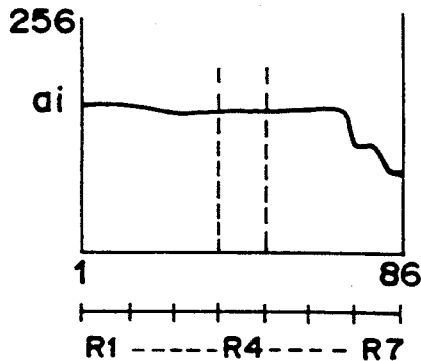

FIG. 13 shows the flow in step S107.

Figure 12B:
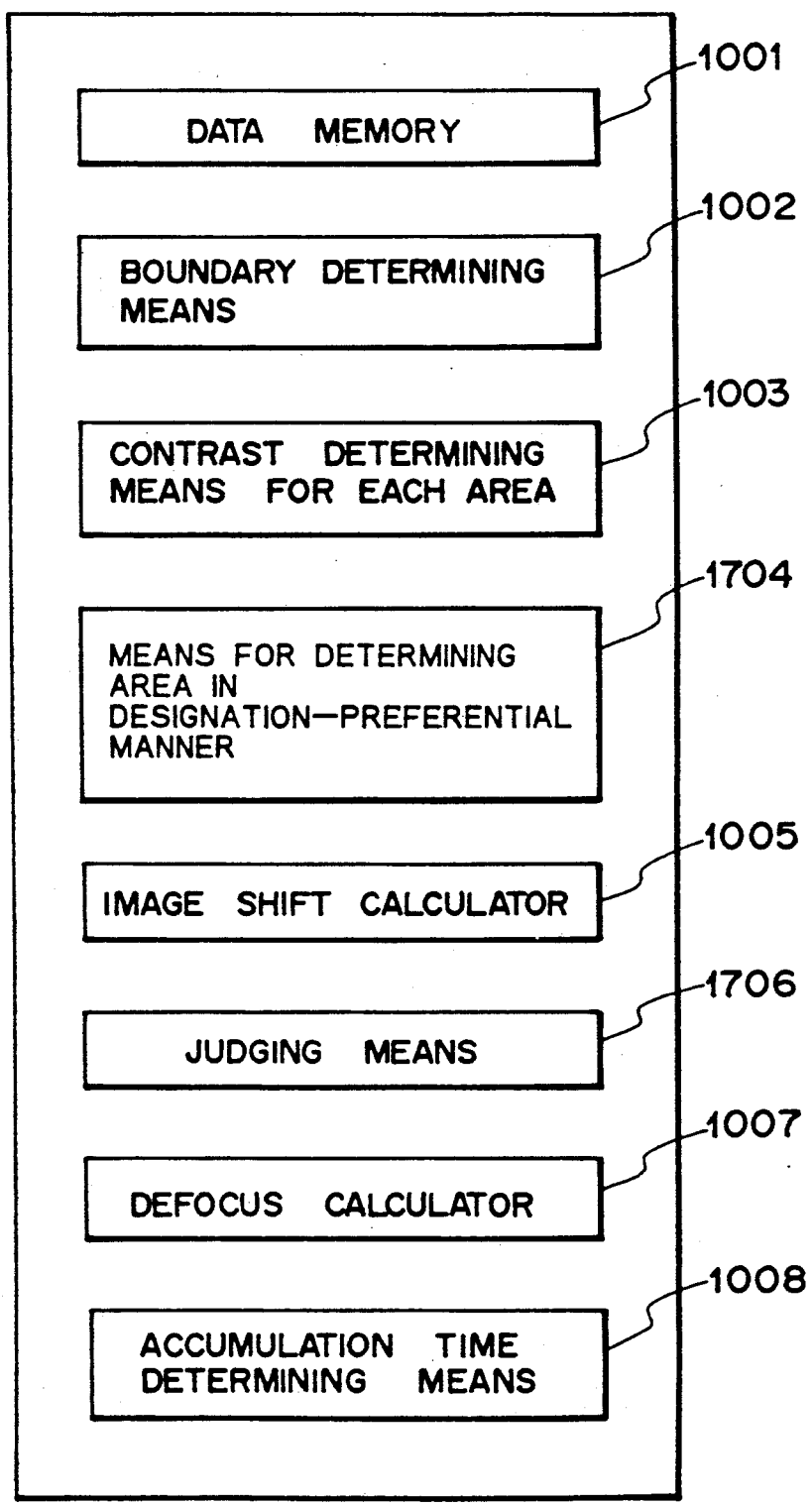

In the Figure, step S107 corresponds to image shift calculator 1005 shown in FIG. 12B, step S177 corresponds to judging means 1706 in FIG. 12B, and the remaining portion corresponds to designation-preferential area determining means.

Figure 4:
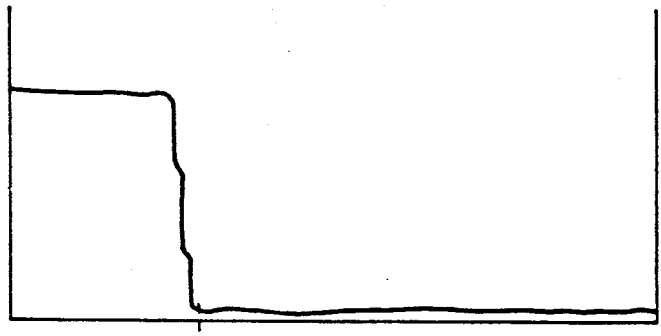
Figure 5:
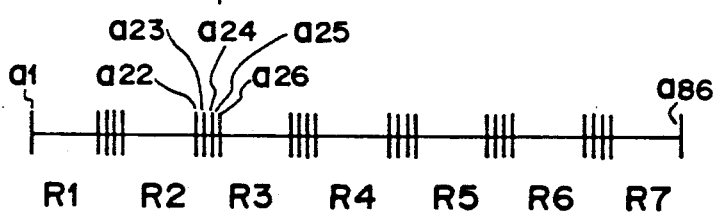

First, in step S171 the designated area is read out. Then, $\xi=2$, 4 and 6 is set on the basis of FIG. 4A according to whether the designated detection area is R2 to R4 or R6.

Now, a case when $\xi=2$ will be described with reference to steps S271, S272, S173, S182, S183, S176 and S181. The local focus detection areas for focus detection are, in the preferential order, $r=2$ with $i=0$,
$r=1$ and $r=3$ with $i=1$;
$r=4$ with $i=2$,
$r=5$ with $i=3$,
$r=6$ with $i=4$, and
$r=7$ with $i=5$ If it is found in step S272 that r is outside the range, $E(r)=0$ is set in step S175.

Steps S173, S172, S175 and S176 have the same functions as steps S73, S72, S75 and S76.

The content of step S177 is as shown in Table 5. The gist of this table is the same as that of Table 3 except that only a single side area can be obtained from $i=2$ if $\xi$ is 2 and 6, for instance.

In step S110 the next accumulaton time is determined such that the peak of the image output of the area--; for which the focus detection calculation was performed in step S107, and adopted to calculate defocus in step S109, has a predetermined value.

TABLE 5

| i | Result determination content | Defocus DEF |
|---|------------------------------|-------------|
| 0 | FI = 1 if $E(\xi) >$ Eth 1<br>FI = 0 otherwise | FI = 1: DEF = DEF($\xi$) = K($\xi$)*Z($\xi$) + O($\xi$) |
| 1 | FI = 10 if $E(\overline{\xi 1}) >$ Eth 1 and $E(\overline{\xi 1}) >$ Eth 1<br>FI = 11 if $E(\xi 1) >$ Eth 1 and $E(\overline{\xi 1}) >$ Eth 1<br>FI = 12 if $E(\xi 1) \leq$ Eth 1 and $E(\overline{\xi 1}) >$ Eth 1<br>FI = 13 if $E(\xi 1) \leq$ Eth 1, $E(\overline{\xi 1}) \leq$ Eth 1 and $E(\overline{\xi 1}) + E(\xi) + E(\xi) >$ Eth 2<br>FI = 0 otherwise | FI = 10: DEF = Near {DEF($\xi 1$), DEF($\overline{\xi 1}$)}<br>FI = 11: DEF = DEF($\xi 1$)<br>FI = 12: DEF = DEF($\overline{\xi 1}$)<br>FI = 13: DEF is a combination of DEF($\overline{\xi 1}$), DEF($\xi$), and DEF($\xi 1$) |
| 2 | FI = 20 if $E(\xi 2) >$ Eth 1 and $E(\overline{\xi 2}) >$ Eth 1<br>FI = 21 if $E(\xi 2) >$ Eth 1 and $E(\overline{\xi 2}) \leq$ Eth 1<br>FI = 22 if $E(\xi 2) \leq$ Eth 1 and $E(\overline{\xi 2}) >$ Eth 1 | FI = 20: DEF = Near {DEF($\xi 2$), DEF($\overline{\xi 2}$)}<br>FI = 21: DEF = DEF($\xi 2$)<br>FI = 22: DEF = DEF($\overline{\xi 2}$) |

TABLE 5-continued

| i | Result determination content | Defocus DEF |
|---|---|---|
|   | With $E(\xi2) \leq$ Eth 1, $E(\overline{\xi2}) \leq$ Eth 1, E234 = $E(\overline{\xi2}) + E(\overline{\xi1}) + E(\xi)$ and E456 = $E(\xi) + E(\xi1) + E(\xi2)$, | FI = 23: DEF is a closer one to camera of a combination of DEF($\xi2$) to DEF($\xi$) and a combination of DEF($\xi$) to DEF($\overline{\xi2}$) |
|   | FI = 23 if E234 > Eth 2 and E456 > Eth 2 | |
|   | FI = 24 if E234 > Eth 2 and E456 $\leq$ Eth 2 | FI = 24: DEF is a combination of DEF($\overline{\xi2}$) to DEF($\xi$) |
|   | FI = 25 if E234 $\leq$ Eth 2 and E456 > Eth 2 | FI = 25: DEF is a combination of DEF($\xi$) to DEF($\xi2$) |
|   | FI = 0 otherwise | |
| 3 | FI = 30 if $E(\xi3) >$ Eth 1 and $E(\overline{\xi3}) >$ Eth 1 | FI = 30: DEF = Near {DEF($\xi3$), DEF($\overline{\xi3}$)} |
|   | FI = 31 if $E(\xi3) >$ Eth 1 and $E(\overline{\xi3}) \leq$ Eth 1 | FI = 31: DEF = DEF($\xi3$) |
|   | FI = 32 if $E(\xi3) \leq$ Eth 1 and $E(\overline{\xi3}) >$ Eth 1 | FI = 32: DEF = DEF($\overline{\xi3}$) |
| 4 | Likewise | Likewise |

(Note)
$E(r) = 0$ if r is outside a predetermined range ($r < 1$ or $r > 7$).
As designated area $r = \xi$, area $\xi + 1$ is expressed as $\xi1$, $\xi - 1$ as $\overline{\xi1}$, $\xi + 2$ as $\xi2$ and $\xi - 2$ as $\overline{\xi2}$.

In the above embodiments, an image sensor having a wide range focus detection area is divided for selectable local focus detection areas by the method described before such as to permit high speed processing for highly accurate focus detection. Thus, the focus speed and accuracy are improved. Further, since the focus detection area is increased, the result of focus detection is not changed at all even if a swing of the detection area with respect to a foreground object is caused due to movement of the photographer's hands holding the camera. There is less possibility of lens position hunting, and the intended focus can be reliably captured.

The above embodiments concern TTL type focus adjusters used for single-lens reflex camera. However, the focus adjuster according to the invention is not limited to a TTL type focus adjuster. For example, the focus adjuster according to the invention is applicable to a triangulation distance measuring device for a lens shutter camera.

I claim:

1. A focus adjuster comprising:
   first and second light-receiving means each including a plurality of photoelectric converting elements in a uni-dimensional arrangement, said first and second light-receiving means providing respective light intensity distribution signals representing the intensity of light incident on said plurality of photoelectric converting elements;
   an optical system for leading light to said first and second light-receiving means from a field to be photographed;
   selecting means for selecting a group of adjacent photoelectric converting elements of said first light-receiving means and for determining at least one borderline between said group and the remainder of said first light-receiving means on the basis of changes in the light intensity distribution signal of said first light-receiving means in the direction of arrangement of said plurality of photoelectric converting elements of said first light-receiving means; and
   calculating means for producing, according to the light intensity distribution signal of said group and also to a light intensity distribution signal of at least part of the plurality of photoelectric converting elements of said second light-receiving means, a signal representing a relation between the light intensity distribution over said group and the light intensity distribution over said at least part of the plurality of photoelectric converting elements of said second light-receiving means.

2. The focus adjuster according to claim 1, wherein said selecting means progressively calculates differences between photoelectric outputs of adjacent ones of a plurality of photoelectric converting elements in a predetermined area of said first light-receiving means and selects said group according to the result of calculation.

3. The focus adjuster according to claim 2, wherein said selecting means selects said group such that said group includes one of two photoelectric converting elements corresponding to a minimum value of said calculated differences.

4. The focus adjuster according to claim 1, which comprises a further plurality of photoelectric converting elements disposed in a uni-dimensional arrangement substantially parallel to the direction of arrangement of the plurality of photoelectric converting elements of said first light-receiving means, and in which all of said photoelectric converting elements are charge accumulation type elements, and the charge accumulation time of the elements of said group is controlled according to outputs of said further plurality of photoelectric converting elements.

5. A focus controller comprising:
   first and second light-receiving means each including a plurality of photoelectric converting elements in a uni-dimensional arrangement, said first and second light-receiving means each providing a light intensity distribution signal representing the intensity of light incident on said plurality of photoelectric converting elements;
   an optimal system for leading light to said first and second light-receiving means from a field to be photographed;
   dividing means for dividing the plurality of photoelectric converting elements of said first light-receiving means into a plurality of groups of adjacent photoelectric converting elements, said dividing means determining borderlines among said plurality of groups on the basis of changes in said light intensity distribution signal of said first light-receiving means in the direction of arrangement of said plurality of photoelectric converting elements of said first light-receiving means; and
   calculating means for calculating, according to a light intensity distribution signal of at least one of said plurality of groups and a light intensity distribution signal of at least part of the plurality of photoelectric converting elements of said second light-receiving means, a relation between the light intensity distribution over said at least one of said plurality of groups and the light intensity distribution over said at least part of the plurality of photoelectric converting elements of said second light-receiving means.

6. The focus adjuster according to claim 5, wherein said dividing means progressively calculates differences between photoelectric outputs of adjacent ones of a plurality of photoelectric converting elements in a plurality of predetermined areas of said first light-receiving means and determines borderlines among said plurality of groups according to the result of the progressive calculation.

7. The focus adjuster according to claim 6, wherein said dividing means divides said first light-receiving means into said plurality of groups such that two photoelectric converting elements corresponding to a minimum value of said calculated differences belong to different groups.

8. The focus adjuster according to claim 5, wherein said dividing means divides said plurality of photoelectric converting elements of said first light-receiving means into a central group and two end groups adjacent to the opposite ends of said central group in the direction of arrangement of said plurality of photoelectric converting element, and said calculating means calculates at least a relative shift between a light intensity distribution over said central group and the light intensity distribution over said at least part of the plurality of photoelectric converting elements of said second light-receiving means.

9. The focus adjuster according to claim 5, wherein said dividing means divides the plurality of photoelectric converting elements of said second light-receiving means into a plurality of groups according to said plurality of groups of said first light-receiving means, and said calculating means calculates a relative shift between the light intensity distribution over one group of said first light-receiving means and one group of said second light-receiving means.

10. The focus adjuster according to claim 5, in which said dividing means divides said second light-receiving means into a plurality of groups corresponding to said plurality of groups of said first light-receiving means, and calculates a plurality of relative shifts between light-intensity distributions over respective groups of said first and second light-receiving means, and which further comprises judging means for judging whether said plurality of calculated relative shifts are reliable, said calculating means calculating, when said judging means judges that said plurality of calculated relatives shifts are all unreliable, a relative shift between a light intensity distribution over one of said plurality of groups of said first light-receiving means and a light intensity distribution over all the photoelectric converting elements of said second light-receiving means.

11. A focus adjuster comprising:
first and second light-receiving means each including a plurality of charge accumulation type photoelectric converting elements in a uni-dimensional arrangement, said first and second light-receiving means each repeatedly providing a light intensity distribution signal representing the intensity of light incident on the plurality of photoelectric converting elements thereof;

a plurality of photoelectric converting means disposed substantially parallel to the direction of arrangement of the plurality of photoelectric converting elements of said first light-receiving means, each of said plurality of photoelectric converting means providing an output corresponding to the intensity of incident light thereon;

an optical system for leading light to said first and second light-receiving means from a field to be photographed;

dividing means for dividing said plurality of photoelectric converting elements of said first light-receiving means into a plurality of groups of adjacent photoelectric converting elements selecting means for selecting one of said plurality of groups of said first light-receiving means;

focus determining means for detecting a focus state of a photographing lens on the basis of a light intensity distribution signal of the selected group and the light intensity distribution signal of said second light-receiving means; and control means for controlling the charge accumulation time of the pluralities of photoelectric converting elements of said first and second light-receiving means, said control means effecting control of the charge accumulation time of said first and second light-receiving means according to the output of a predetermined one of said plurality of photoelectric converting means and subsequently effecting control of the charge accumulation time of said first and second light-receiving means on the basis of the light intensity distribution signal of said selected group.

12. A focus adjuster according to claim 11, wherein the number of said plurality of photoelectric converting means is odd, and wherein said predetermined one is at a central position among said plurality of photoelectric converting means.

13. A focus adjuster comprising
first and second light-receiving means each including a plurality of photoelectric converting elements in a uni-dimensional arrangement, said first and second light-receiving means each providing a light intensity distribution signal representing the intensity of light incident on said plurality of photoelectric converting elements;

an optical system for leading light to said first and second light-receiving means from a field to be photographed;

dividing means for dividing said plurality of photoelectric converting elements of said first light-receiving means into a plurality of groups of adjacent photoelectric converting elements;

calculating means for calculating, according to a light intensity distribution signal of a predetermined one of said plurality of groups and a light intensity distribution signal of at least part of the plurality of photoelectric converting elements of said second light-receiving means, a relative shift between the light intensity distribution over said predetermined one group and the light intensity distribution over said at least part of the plurality of photoelectric converting elements of said second light-receiving means; and judging means for judging whether said calculated relative shift is reliable, said calculating means calculating, when the relative shift judged by said judging means is unreliable, a relative shift between the light intensity distribution over two of said plurality of groups adjacent to said predetermined one group and the light intensity distribution over said at least part of the plurality of photoelectric converting elements of said second light-receiving means according to a light intensity distribution signal of said two groups and a light intensity distribution signal of said at least part of the plurality of photoelectric converting elements of said second light-receiving means.

14. A focus adjuster according to claim 13, wherein the number of said plurality of groups is odd, and wherein said predetermined one is at a central position among said plurality of groups.

15. A focus adjuster according to claim 13, wherein said judging means has contrast detecting means for detecting contrast indicated by the light intensity distribution signal of said predetermined one group, and wherein said judging means judges reliability of said calculated relative shift on the basis of the detected contrast.

16. A focus adjuster comprising:
   first and second light-receiving means each including a plurality of photoelectric converting elements in a uni-dimensional arrangement, said first and second light-receiving means each providing a light intensity distribution signal representing the intensity of light incident on said plurality of photoelectric converting elements;
   an optical system for leading light to said first and second light-receiving means from a field to be photographed;
   dividing means for dividing said pluralities of photoelectric converting elements of said first light-receiving means into a plurality of groups of adjacent photoelectric converting elements;
   calculating means for calculating, according to light intensity distribution signals of said groups and at least part of the plurality of photoelectric converting elements of said second light-receiving means, a plurality of relative shifts between the light intensity distributions over said plurality of groups and the light intensity distribution over said at least part of the plurality of photoelectric converting elements of said second light-receiving means; and
   judging means for judging whether said plurality of calculated relative shifts are reliable, said calculating means calculating, when said judging means judges that said plurality of calculated relative shifts are all unreliable, a relative shift between the light intensity distribution over a selected group of photoelectric converting elements of said first light-receiving means and the light intensity distribution over all the plurality of photoelectric converting elements of said second light-receiving means according to a light intensity distribution signal of said selected group and a light intensity distribution signal of all the photoelectric converting elements of said second light-receiving means.

17. A focus adjuster according to claim 16, wherein said judging means has contrast detecting means for detecting contrast indicated by the light intensity distribution signal of each of said plurality of groups and selects as said selected group the group which has highest contrast among said plurality of groups.

* * * * *